(12) United States Patent
Kuwamura et al.

(10) Patent No.: US 9,388,701 B2
(45) Date of Patent: Jul. 12, 2016

(54) TURBINE

(75) Inventors: Yoshihiro Kuwamura, Tokyo (JP);
Kazuyuki Matsumoto, Tokyo (JP);
Hiroharu Oyama, Tokyo (JP);
Yoshinori Tanaka, Tokyo (JP); Asaharu Matsuo, Kobe (JP)

(73) Assignee: MITSUBISHI HITACHI POWER SYSTEMS, LTD., Yokohama-shi (JP)

( * ) Notice: Subject to any disclaimer, the term of this patent is extended or adjusted under 35 U.S.C. 154(b) by 707 days.

(21) Appl. No.: 13/519,403

(22) PCT Filed: Jan. 31, 2011

(86) PCT No.: PCT/JP2011/051895
§ 371 (c)(1),
(2), (4) Date: Jun. 27, 2012

(87) PCT Pub. No.: WO2011/122092
PCT Pub. Date: Oct. 6, 2011

(65) Prior Publication Data
US 2012/0288360 A1    Nov. 15, 2012

(30) Foreign Application Priority Data

Mar. 30, 2010    (JP) .................................. 2010-079006

(51) Int. Cl.
*F01D 5/22*    (2006.01)
*F01D 11/02*    (2006.01)
(Continued)

(52) U.S. Cl.
CPC ................ *F01D 5/225* (2013.01); *F01D 11/02* (2013.01); *F01D 11/08* (2013.01); *F16J 15/4472* (2013.01); *F05D 2240/55* (2013.01)

(58) Field of Classification Search
CPC ......... F01D 11/00; F01D 11/02; F01D 11/08; F01D 11/12; F01D 11/122; F01D 11/127; F01D 5/225
See application file for complete search history.

(56) References Cited

U.S. PATENT DOCUMENTS

| 899,319 A | * | 9/1908 | Parsons .................... F01D 11/08 |
| | | | 415/173.5 |
| 4,351,532 A | | 9/1982 | Laverty |

(Continued)

FOREIGN PATENT DOCUMENTS

| CH | DE 102006046550 | * | 4/2007 | .............. F01D 11/02 |
| CN | 1212321 A | | 3/1999 | |

(Continued)

OTHER PUBLICATIONS

Extended European Search Report dated Jul. 8, 2014, issued in corresponding European Patent application No. 11762333.0 (6 pages).

(Continued)

*Primary Examiner* — Igor Kershteyn
*Assistant Examiner* — Christopher R Legendre
(74) *Attorney, Agent, or Firm* — Westerman, Hattori, Daniels & Adrian, LLP

(57) ABSTRACT

A turbine (1) of the present invention comprises that at one part of a tip part (51) of the blade (50) and an area (11a) of the structure (11) corresponding to the tip part (51) of the blade, a stepped part (52) is formed, a seal fin (15) is provided at the another part of the tip part (51) of the blade and the area (11a) of the structure (11), a cavity (C) is formed between the tip part (51) of the blade and the area (11a) of the structure (11) and between the seal fin (15) and a partition wall (54, 15). The seal fin (15) comprises a fin main body part (16), and a space restriction part (17). Thus, the present invention provides a high performance turbine in which the leakage flow rate is reduced.

20 Claims, 13 Drawing Sheets

(51) Int. Cl.
*F01D 11/08* (2006.01)
*F16J 15/447* (2006.01)

(56) References Cited

U.S. PATENT DOCUMENTS

| | | | |
|---|---|---|---|
| 4,662,820 A | 5/1987 | Sasada et al. | |
| 5,143,383 A | 9/1992 | Glynn et al. | |
| 5,244,216 A | 9/1993 | Rhode | |
| 5,639,095 A | 6/1997 | Rhode | |
| 6,102,655 A * | 8/2000 | Kreitmeier | 415/173.3 |
| 7,445,213 B1 | 11/2008 | Pelfrey | |
| 7,708,520 B2 * | 5/2010 | Paolillo et al. | 415/174.5 |
| 2009/0072487 A1 | 3/2009 | Chougule et al. | |
| 2010/0143103 A1 * | 6/2010 | Sellars et al. | 415/173.4 |
| 2010/0215506 A1 * | 8/2010 | Heyes et al. | 416/241 R |
| 2010/0232966 A1 * | 9/2010 | Ono et al. | 416/179 |
| 2011/0058933 A1 * | 3/2011 | Elorza Gomez | 415/168.2 |
| 2011/0070074 A1 * | 3/2011 | Schabowski et al. | 415/174.5 |
| 2012/0288360 A1 * | 11/2012 | Kuwamura et al. | 415/173.1 |
| 2013/0129493 A1 * | 5/2013 | Matsumoto et al. | 415/191 |
| 2013/0149118 A1 * | 6/2013 | Lotfi et al. | 415/174.5 |
| 2013/0251534 A1 * | 9/2013 | Matsumoto et al. | 416/223 R |
| 2013/0272855 A1 * | 10/2013 | Kuwamura et al. | 415/173.5 |
| 2014/0154061 A1 * | 6/2014 | Kuwamura et al. | 415/173.1 |

FOREIGN PATENT DOCUMENTS

| | | | |
|---|---|---|---|
| CN | 2725533 Y | | 9/2005 |
| CN | 2913750 Y | * | 6/2007 |
| EP | 1930551 A2 | | 6/2008 |
| EP | 2096262 A1 | | 9/2009 |
| GB | 2408548 A | | 6/2005 |
| JP | 53038806 A | * | 4/1978 |
| JP | 53-104803 U | | 8/1978 |
| JP | 59-51104 A | | 3/1984 |
| JP | 61-134501 U | | 8/1986 |
| JP | 63-61501 U | | 4/1988 |
| JP | 4-35601 B2 | | 6/1992 |
| JP | 4-350302 A | | 12/1992 |
| JP | 9-13905 A | | 1/1997 |
| JP | 10-311205 A | | 11/1998 |
| JP | 11-148307 A | | 6/1999 |
| JP | 11-148308 A | | 6/1999 |
| JP | 11-200810 A | | 7/1999 |
| JP | 2002-228014 A | | 8/2002 |
| JP | 2004-332616 A | | 11/2004 |
| JP | 2005180278 A | * | 7/2005 |
| JP | 2006-291967 A | | 10/2006 |
| JP | 2008-223660 A | | 9/2008 |
| JP | 2009-47043 A | | 3/2009 |
| JP | 2010-216321 A | | 9/2010 |
| JP | 2011-080452 A | | 4/2011 |
| JP | 2012154201 A | * | 8/2012 |
| JP | 201 51 4091 | * | 8/2015 |

OTHER PUBLICATIONS

Chinese Office Action dated Nov. 18, 2014, issued in corresponding Chinese Patent Application No. 201080023193.2, (U.S. Appl. No. 13/386,084), w/English translation, (14 pages).
International of Search Report of PCT/JP2010/067350, date of Dec. 28, 2010 with English translation and Written Opinion (4 pages).
Written Opinion dated Dec. 28, 2010, issued in corresponding application No. PCT/JP2010/067350 with English translation (7 pages).
International Search Report of PCT/JP2011/079808, date of Feb. 7, 2012 with English translation and Written Opinion (4 pages).
Written Opinion dated Feb. 7, 2012, issued in corresponding application No. PCT/JP2011/079808 with English translation (9 pages).
International Search Report of PCT/JP2011/051895, date of mailing Apr. 5, 2011, with Written Opinion (PCT/ISA/237).
Chinese Office Action dated Jan. 28, 2014, issued in Chinese Patent Application No. 2011800051510, w/partial English translation of search report (9 pages).

* cited by examiner

TURBINE

TECHNICAL FIELD

The present invention relates to a turbine used in a power plant, a chemical plant, a gas plant, an ironwork, a ship, and so on.

BACKGROUND ART

As is well known, a steam turbine including a casing, a shaft body (rotor) rotatably installed in the casing, a plurality of stationary blades fixed to an inner circumference of the casing and disposed in a circumferential direction, and a plurality of moving blades radially installed at the shaft body in a downstream side of the plurality of stationary blades is used. In the case of an impulse turbine among steam turbines, pressure energy of steam is converted into velocity energy by the stationary blades, and the velocity energy is converted into rotational energy (mechanical energy) by the moving blades. In addition, in the case of a reaction turbine among the steam turbines, pressure energy is converted into velocity energy in the moving blades, and velocity energy is converted into rotational energy (mechanical energy) by a reaction force caused by ejection of steam.

In the steam turbine, in general, a space in a radial direction is formed between a tip part of the moving blade and the casing configured to form a flow path for steam by surrounding the moving blade, and a space in a radial direction is also formed between a tip part of the stationary blade and the shaft body. Here, leakage steam passing through the space of the tip part of the moving blade at a downstream side does not apply a rotational force to the moving blade. In addition, leakage steam passing through the space of the tip part of the stationary blade at a downstream side barely applies a rotational force to the moving blade at the downstream side, because pressure energy is not converted into velocity energy by the stationary blade. Accordingly, in order to improve performance of the steam turbine, it is important to reduce the amount of leakage steam passing through the space.

In the following Patent Document 1, a seal structure in which a stepped part having a height gradually increased from an upstream side toward a downstream side in an axial direction is formed at a tip part of a moving blade, and in which a seal fin is formed at a casing to form a space between the seal pin and the stepped part is disclosed.

According to the seal structure, leakage flow passing through the space between the stepped part and the seal fin collides with a step surface that forms an end edge of the stepped part, increasing the flow resistance and thus reducing the leakage flow rate.

PRIOR ART DOCUMENT

Patent Document

[Patent Document 1] Japanese Patent Laid-open Publication No.: 2006-291967

SUMMARY OF THE INVENTION

Problems to be Solved by the Invention

However, demand for improvement in performance of the steam turbine is strong, and further reduction in leakage flow rate is also needed.

In consideration of the above-mentioned problems, it is an object of the present invention to provide a high performance turbine capable of further reducing a leakage flow rate.

Means for Solving the Problems

A turbine in accordance with the present invention is a turbine comprising: a blade; and a structure spaced apart from a tip side of the blade by a space and relatively rotated around a rotation axis of a shaft body with respect to the blade, wherein, at one part of a tip part of the blade and an part of the structure corresponding to the tip part of the blade, a stepped part, which has a step surface and protrudes toward another part of the tip part of the blade and the part of the structure, is formed, a seal fin extending toward the stepped part is provided at the another part of the tip part of the blade and the part of the structure, and a cavity is formed between the tip part of the blade and the part of the structure and between the seal fin and a partition wall facing to the seal fin on an upstream side of the structure in a direction of the rotation axis. The seal fin comprises: a fin main body part that forms a small space between the fin main body part and the stepped part, and a space restriction part that restricts a space of the small space on the upstream side in the direction of the rotation axis and forms a small cavity between the cavity and the small space.

In the present invention, a fluid flowing into the cavity collides with the step surface that forms an end edge of the stepped part, i.e., a surface facing the upstream side in the direction of the rotation axis of the stepped part to vary the flow direction and returns to the upstream side, generating a primary vortex that turns in a certain direction (a first direction) in the cavity. In addition, as a flow of the part is separated from the primary vortex at the end edge of the step surface, a separation vortex that turns in a direction (a second direction) opposite to the turning direction of the primary vortex is generated. As the separation vortex is generated, a contraction flow effect which reduces a leakage flow passing through the small space between the fin main body part and the stepped part is generated. Further, since the small cavity is formed between the cavity and the small space by the space restriction part, a flow of the separation vortex in the small cavity having a narrower space than the cavity is increased. Accordingly, the contraction flow effect can be sufficiently strengthened by the separation vortex, and the leakage flow rate passing through the small space can be further reduced.

In addition, in the present invention, the space restriction part has a wall surface in the direction of the rotation axis extending from the fin main body part toward the upstream side in the direction of the rotation axis.

In this case, the flow of the separation vortex is restricted by the wall surface in the direction of the rotation axis and the fin main body part. Accordingly, the flow of the separation vortex can be further strengthened, and the contraction flow effect can be further enhanced.

Further, in the present invention, the wall surface in the direction of the rotation axis is recessed in an arc shape in a cross section at a surface including the rotation axis.

In this case, in the cross section at the surface including the rotation axis, the separation vortex flows in the arc shape along the wall surface in the direction of the rotation axis. Accordingly, the flow direction of the separation vortex can be smoothly changed, and a restriction effect to the separation vortex can be increased. Therefore, the flow of the separation vortex can be further strengthened, and the contraction flow effect can be further enhanced.

Furthermore, in the present invention, the wall surface in the direction of the rotation axis is connected to the fin main body part in an arc shape in a cross section at a surface including the rotation axis.

In this case, in the cross section at the surface including the rotation axis, the separation vortex flows from the wall surface in the direction of the rotation axis along the fin main body part in an arc shape. Accordingly, the separation vortex flowing along the wall surface in the direction of the rotation axis can smoothly flow along the fin main body part, and a restriction effect to the separation vortex can be enhanced. Therefore, the flow of the separation vortex can be further strengthened, and the contraction flow effect can be further enhanced.

In addition, at least the tip side of the fin main body part extends at a tilted angle toward the upstream side in the direction of the rotation axis.

In this case, at the upstream side in the direction of the rotation axis of the small space, a downflow of the separation vortex flows toward the leakage flow flowing to the downstream side in the direction of the rotation axis. For this reason, in the vicinity of the tip part of the fin main body part, a velocity element $V_X$ in the direction of the rotation axis of a velocity of a flow in which the leakage flow and the downflow of the separation vortex are joined to flow is reduced. In the vicinity of a tip of the fin main body part, provided that a velocity element in a radial direction of the velocity of the joined flow is $V_R$, since the contraction flow effect of the separation vortex is enhanced as $V_X/V_R$ approaches 0, the contraction flow effect can be further enhanced.

Further, in the present invention, the space restriction part is formed to be spaced apart from the fin main body part by an interval on the upstream side in the direction of the rotation axis, and is a radial direction wall body extending toward the stepped part and forming a space larger than the small space between the wall body and the stepped part.

In this case, in the small cavity, the separation vortex and an auxiliary vortex adjacent to the separation vortex in the radial direction and turning in the same direction as the turning direction of the primary vortex are formed. Accordingly, the contact flow resistance of the separation vortex is reduced. Therefore, the flow of the separation vortex can be strengthened, and the contraction flow effect can be enhanced.

Furthermore, in the present invention, provided that a size of the small space is H, and a distance between the fin main body part and an end edge of the upstream side in the direction of the rotation axis of the stepped part is L, the following Equation (1) is satisfied:

$$0.7H \leq L \qquad (1).$$

In this case, the contraction flow effect by the separation vortex is varied by relations between a position of the end edge (a distance L from the fin main body part) and the size of the small space H. Based on the following simulation results, as the relations are set to satisfy Equation (1), the contraction flow effect by the separation vortex can be sufficiently enhanced, and the leakage flow rate can be further reduced.

In addition, more than one stepped part is provided in such a way that protrusion heights of the stepped parts are gradually increased from the upstream side toward the downstream side in the direction of the rotation axis, at least one of the seal fin extending toward the stepped part is provided for each of the stepped parts at the another part of the tip part of the blade and the part of the structure, and the seal fin corresponding to the stepped part is the partition wall facing to the seal fin corresponding to the stepped part adjacent to the downstream side in the direction of the rotation axis.

In this case, the contraction flow effect by the separation vortex can be obtained at each of the stepped parts, and the leakage flow rate between the blade and the structure facing thereto can be sufficiently reduced.

Further, more than one stepped part is provided in such a way that protrusion heights of the stepped parts are gradually increased from the upstream side toward the downstream side in the direction of the rotation axis, the part of the structure corresponding to the tip part of the blade is an annular recess, and the partition wall, which faces to the seal fin corresponding to the stepped part disposed at the farthest upstream side among the plurality of stepped parts in the direction of the rotation axis, is formed by an inner wall surface of the recess on the upstream side in the direction of the rotation axis.

In this case, even in the stepped part disposed at the farthest upstream side in the direction of the rotation axis, the contraction flow effect by the separation vortex can be obtained, and the leakage flow rate between the blade and the structure facing thereto can be sufficiently reduced.

Effect of the Invention

According to the present invention, it is possible to provide a high performance turbine capable of further reducing the leakage flow rate.

BEST MODE FOR CARRYING OUT THE INVENTION

Hereinafter, embodiments of the present invention will be described in detail with reference to the accompanying drawings.

(First Embodiment)

Figure 1:
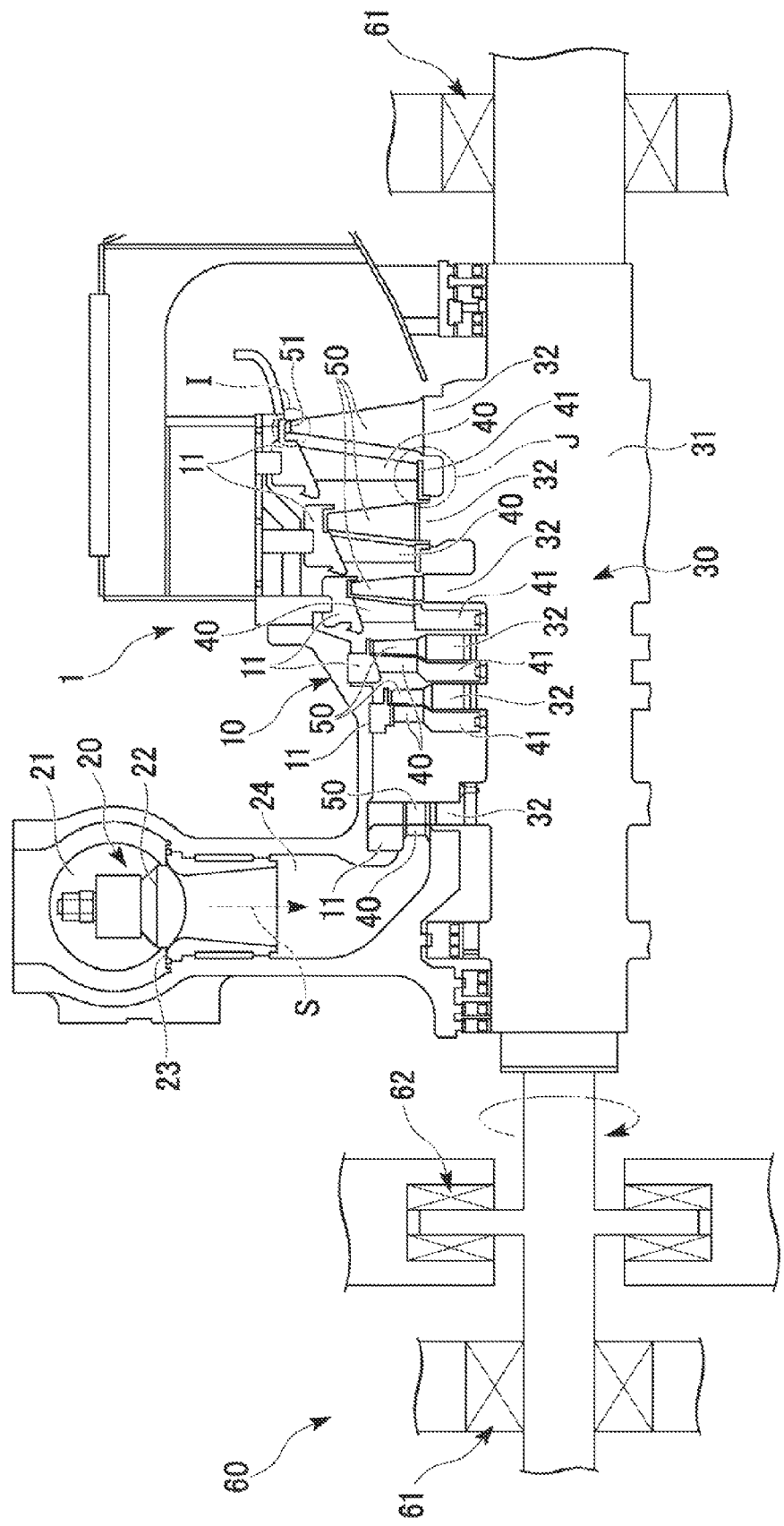
FIG. 1 is a cross-sectional view showing a steam turbine according to a first embodiment of the present invention.

FIG. 1 is a cross-sectional view showing a steam turbine 1 according to a first embodiment of the present invention.

The steam turbine 1 includes a casing 10, a regulating valve 20 that regulates a flow rate and a pressure of steam S introduced into the casing 10, a shaft body 30 which is rotatably installed inside the casing 10 and transmits a driving force (rotational energy) to a machine such as a generator, and so on, a stationary blade 40 installed at the casing 10, a moving blade 50 installed at the shaft body 30, and a bearing part 60 which rotatably supports the shaft body 30 about an rotation axis thereof.

The casing 10 has an inner space extending in a direction of the rotation axis and hermetically sealed. The casing 10 is a flow path of the steam S. A ring-shaped partition plate outer wheel 11 through which the shaft body 30 passes is securely fixed to an inner wall surface in the casing 10. In the embodiment, the partition plate outer wheel 11 is a structure in the present invention.

The regulating valve 20 is installed in plural inside the casing 10. The regulating valve 20 includes a regulating valve chamber 21 into which steam S is introduced from a plurality of boilers (not shown), a valve body 22, and a valve seat 23. A steam chamber 24 is formed at a downstream side of the regulating valve 20. When the valve body 22 is spaced apart from the valve seat 23, a flow path is opened, and the steam S flows into the inner space of the casing 10 via the steam chamber 24.

The shaft body 30 includes a shaft main body 31, and a plurality of disks 32 radially extending from an outer circumference of the shaft main body 31. The shaft body 30 transmits rotational energy to a machine such as a generator (not shown), and so on.

A plurality of stationary blades 40 are radially disposed to surround the shaft body 30 about a center of the shaft body 30. The plurality of stationary blades 40 constitute an annular stationary blade group, and are held by the partition plate outer wheel 11. A ring-shaped hub shroud 41 through which the shaft body 30 is inserted is connected to an inner side of the stationary blade 40 in a radial direction, and a tip part of the stationary blade 40 is installed to be spaced from the shaft body 30 by a space in a radial direction.

Six annular stationary blade groups, each of which is constituted by the plurality of stationary blades 40, are formed at intervals in the direction of the rotation axis. The annular stationary blade groups convert pressure energy of the steam S into velocity energy, and guide the steam S to the moving blade 50 side adjacent to the downstream side.

A plurality of moving blades 50 are securely installed at an outer circumference of the disk 32 having the shaft body 30. The plurality of moving blades 50 are radially disposed about the shaft body 30. The plurality of moving blades 50 constitute an annular moving blade group at the downstream side of each of the annular stationary blade groups. In the embodiment, the moving blade 50 is a "blade" in the present invention.

The annular stationary blade group and the annular moving blade group are combined as one set to form one stage. For this reason, the steam turbine 1 is constituted in six stages. A tip shroud 51 extending in a circumferential direction is installed at the tip part of the moving blade 50.

Figure 2:
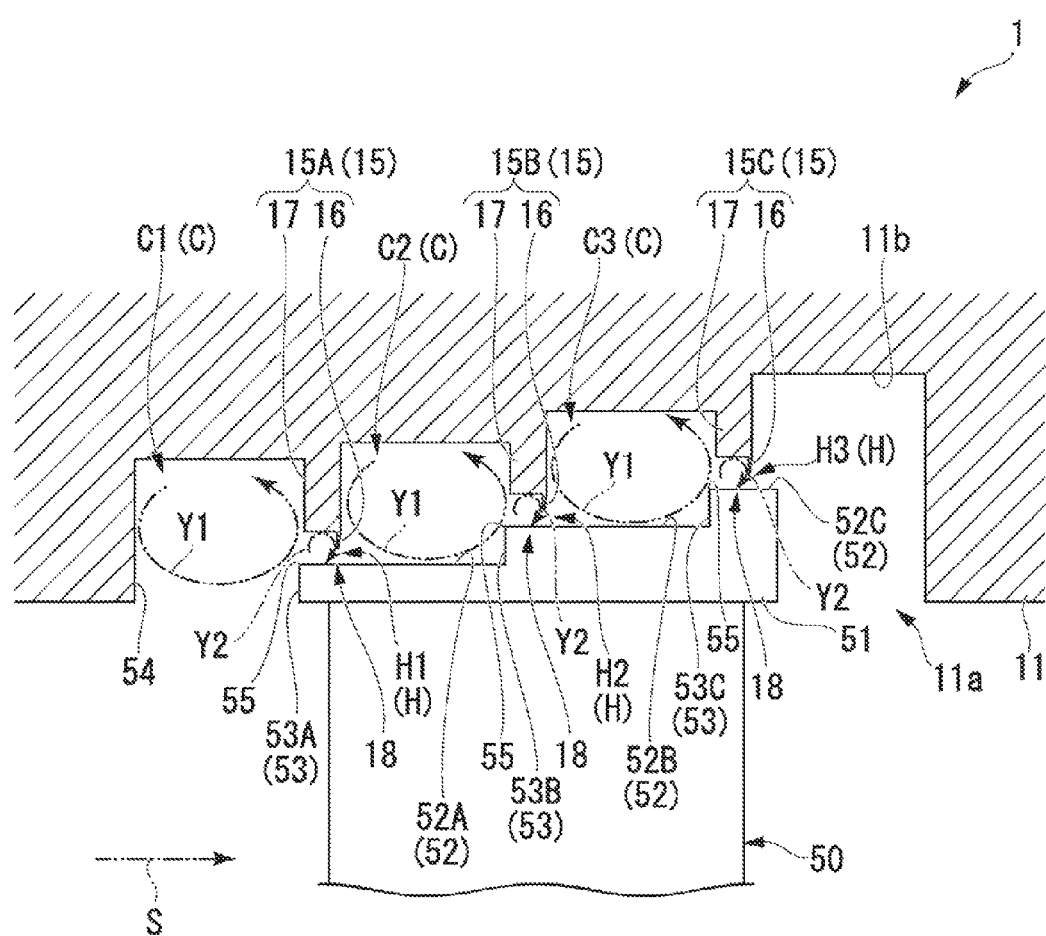
FIG. 2 is an enlarged cross-sectional view of a major part I of FIG. 1.

FIG. 2 is an enlarged cross-sectional view of a major part I of FIG. 1.

As shown in FIG. 2, the tip shroud 51 installed at the tip part of the moving blade 50 is disposed to face the partition plate outer wheel (structure) 11 with a space in the radial direction of the casing 10. The tip shroud 51 is provided with step surfaces 52 (52A to 52C) having step surfaces 53 (53A to 53C) and protruding toward the partition plate outer wheel 11 side.

In the embodiment, the tip shroud 51 is provided with the three step surfaces 52 (52A to 52C). The step surfaces 52 (52A to 52C) have surfaces facing to the partition plate outer wheel 11 and step differences adjacent to the surfaces. The three step surfaces 52A to 52C are disposed from an upstream side toward a downstream side in the direction of the rotation axis (hereinafter referred to as an axial direction) of the shaft body 30 such that a protruding height is gradually increased from the moving blade 50 toward the partition plate outer wheel 11. That is, the step surfaces 53 (53A to 53C) forming the step differences of the step surfaces 52A to 52C are formed toward an upstream side in an axial direction. Further, the step surface 53A is an edge surface of the upstream side of the tip shroud 51 in the axial direction. The step surfaces 52A and 52B are connected to each other via the step surface 53B, and the step surfaces 52B and 52C are connected to each other via the step surface 53C. In addition, hereinafter, an end edge part of the partition plate outer wheel 11 side in the step surfaces 53 (53A to 53C) is referred to as end edges 55 of the step surfaces 52 (52A to 52C).

An annular groove (annular recess) 11a extending in a circumferential direction of the casing 10 (see FIG. 1) is formed at a part of the partition plate outer wheel 11 corresponding to the tip shroud 51. The tip shroud 51 is accommodated in the annular groove 11a.

Three seal fins 15 (15A to 15C) extending toward the tip shroud 51 and inward in the radial direction are formed at a groove bottom surface 11b of the annular groove 11a of the partition plate outer wheel 11. The annular groove 11a is formed in a stepped shape such that a downstream side becomes deeper in comparison with the upstream side of the seal fins 15 in the axial direction. That is, the groove bottom surface 11b of the annular groove 11a is formed in a stepped shape from the upstream side toward the downstream side in the axial direction to be gradually spaced apart from the moving blade 50.

The seal fins 15 (15A to 15C) extend from the groove bottom surface 11 b in one-to-one correspondence with the step surfaces 52 (52A to 52C). Specifically, the seal fins 15 (15A to 15C) are formed to face a part (near the end edges 55) of the upstream side of the step surfaces 52 (52A to 52C) in the axial direction. In addition, the step surfaces 53 (53A to 53C) are formed at a slightly upstream side in the axial direction in comparison with the seal fins 15 (15A to 15C). The seal fins 15A to 15C include fin main body parts 16 formed between the seal fins 15A to 15C and the step surfaces 52 (52A to 52C) to provide small spaces H (H1 to H3) in the radial direction, and space restriction parts 17 which restricts spaces at the upstream sides of the small spaces H (H1 to H3) in the axial direction.

Figure 3:
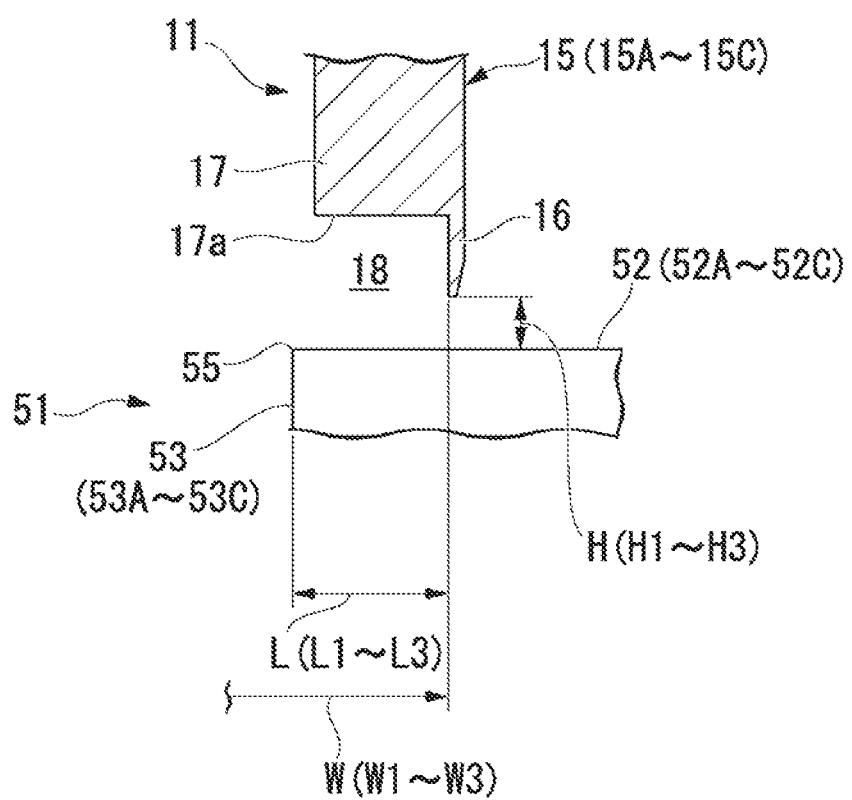
FIG. 3 is an enlarged cross-sectional view of a seal fin according to the first embodiment.

FIG. 3 is an enlarged cross-sectional view of the seal fins 15 (15A to 15C) according to the first embodiment.

As shown in FIG. 3, the fin main body parts 16 have tip parts formed in a pointed shape. The fin main body parts 16 are closer to the step surfaces 52 (52A to 52C) than the space restriction parts 17 are, and form the small spaces H (H1 to H3) between the fin main body parts 16 and the step surfaces 52 (52A to 52C). Lengths of the fin main body parts 16 in the radial direction are substantially equal to dimensions (in the radial direction) of the small spaces H (H1 to H3). The dimensions of the small spaces H (H1 to H3) are minimally set within a safety range to prevent contact between the fin main body parts 16 and the step surfaces 52 in consideration of a thermal expansion amount of the casing 10 or the moving blade 50, centrifugal elongation of the moving blade 50, and so on. In addition, in the embodiment, all of the small spaces H1 to H3 have the same dimension. However, these may be appropriately changed.

The space restriction parts 17 are thicker than the fin main body parts 16 of the seal fins 15 (15A to 15C) in the axial direction. The space restriction parts 17 have inner circumference wall surfaces (a wall surface in the direction of the rotation axis) 17a extending in the axial direction. The inner circumference wall surfaces 17a are formed on surfaces facing to the step surfaces 52 (52A to 52C), and formed in a straight shape extending in the axial direction in a cross section (which may hereinafter be referred to as a "sectional view") at surfaces including the rotation axis. The inner circumference wall surface 17a extends from the fin main body part 16 toward the axial direction upstream side. In other word's, the fin main body part 16 protrudes from an end of the axial direction downstream side of the inner circumference wall surface 17a toward the step surfaces 52 (52A to 52C).

A width of the inner circumference wall surface 17a in the axial direction is about two times that of the small spaces H (H1 to H3). In addition, since a length of the fin main body part 16 in the radial direction is substantially equal to a dimension (dimension in the radial direction) of the small spaces H (H1 to H3), an interval between the inner circumference wall surface 17a and the step surfaces 52 (52A to 52C) is about two times the small spaces H (H1 to H3).

In addition, the fin main body part 16, the space restriction part 17 and the partition plate outer wheel 11 may be integrally formed with each other, or may be separately formed from each other. Further, when the fin main body part 16 and the space restriction part 17 are separately formed from each other, the fin main body part 16. may be installed at a tip side (the step surfaces 52 side) of the space restriction part 17 extending from the groove bottom surface 11b, or the space restriction part 17 may be disposed along the fin main body part 16 extending from the groove bottom surface 11b.

The space restriction parts 17 restrict spaces of the axial direction upstream side of the fin main body parts 16 in the radial direction to form small cavities 18 between the space restriction parts 17 and the step surfaces 52 (52A to 52C). That is, the small cavities 18 are formed between the inner circumference wall surfaces 17a of the space restriction parts 17 and the step surfaces 52 (52A to 52C). The small cavities 18 may have a square shape, one side of which is about two times the width of each of the small spaces H (H1 to H3), in a cross section of the surface including the rotation axis.

As shown in FIG. 2, three cavities C (C1 to C3) are formed between the tip shroud 51 and a part (the annular groove 11a) of the partition plate outer wheel 11 corresponding to the tip shroud 51.

The three cavities C (C1 to C3) are formed between the seal fins 15 (15A to 15C) corresponding to the step surfaces 52 (52A to 52C) and partition walls facing to the axial direction upstream side with respect to the seal fins 15 (15A to 15C).

The partition wall in the first cavity C1 disposed at the farthest upstream side in the axial direction is formed by an inner wall surface 54 of the axial direction upstream side of the annular groove 11a. That is, the first cavity C1 is formed by the inner wall surface 54, the seal fin 15A corresponding to the first stage of step surface 52A, and the groove bottom surface 11b of the partition plate outer wheel 11.

In addition, the partition wall in the second cavity C2 is formed by the seal fin 15A corresponding to the step surface 52A. That is, the second cavity C2 is formed by the seal fin 15A, the seal fin 15B, the step surface 52A, and the groove bottom surface 11b of the partition plate outer wheel 11.

Further, the partition wall in the third cavity C3 is formed by the seal fin 15B corresponding to the step surface 52B. That is, the third cavity C3 is formed by the seal fin 15B, the seal fin 15C, the step surface 52B, and the groove bottom surface 11b of the partition plate outer wheel 11.

Furthermore, the small cavities 18 are formed between the cavities C (C1 to C3) and the small spaces H (H1 to H3). In other words, the space restriction part 17 forms the small cavities 18 between the cavities C (C1 to C3) and the small spaces H (H1 to H3).

As shown in FIG. 1, the bearing part 60 includes a journal bearing device 61 and a thrust bearing device 62, and rotatably supports the shaft body 30. For this reason, the moving blade 50 and the partition plate outer wheel 11 can be relatively rotated around the shaft body 30. Similarly, the stationary blade 40 and the shaft body 30 can be relatively rotated.

Next, an operation of the steam turbine 1 will be described with reference to FIGS. 1 to 4.

First, when the regulating valve 20 (see FIG. 1) is in an open state, the steam S from the boiler (not shown) flows into the inner space of the casing 10.

The steam S flowing into the inner space of the casing 10 sequentially passes through each stage of the annular stationary blade group and the annular moving blade group. First, the pressure energy of the steam S is converted into the velocity energy by the stationary blade 40. Next, most of the steam S passing between the stationary blades 40 flows between the moving blades 50 constituting the same stage, and the velocity energy of the steam S is converted into rotational energy by the moving blades 50. A rotational force is applied to the shaft body 30 by the rotational energy. Meanwhile, a part (for example, several %) of the steam S passing between the stationary blades 40 is discharged between the stationary blades 40, and then flows into the annular groove 11a to become leakage steam.

Figure 4:
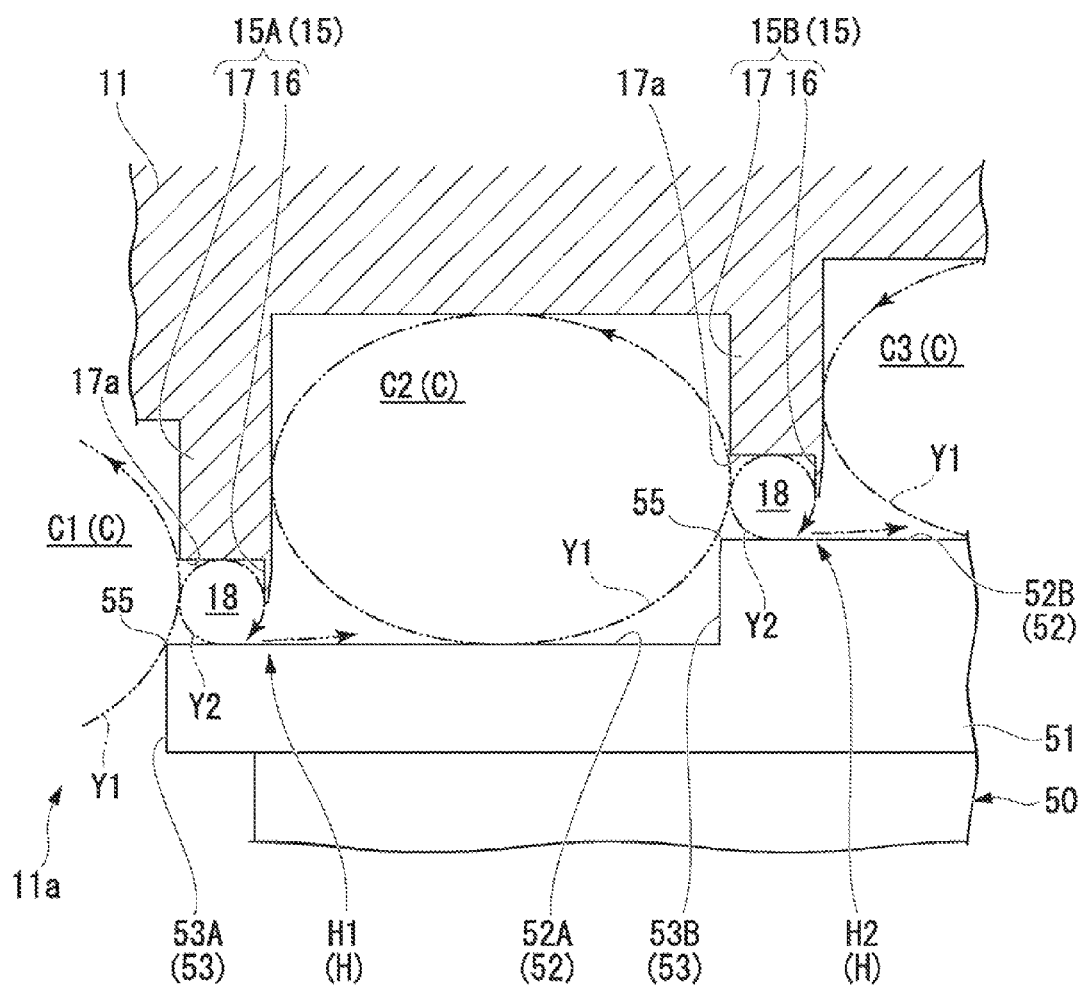
FIG. 4 is a view for explaining an operation of the steam turbine according to the first embodiment.

As shown in FIG. 4, first, the steam S flowing into the annular groove 11a flows into the first cavity C1. The steam S flowing into the first cavity C1 collides with the step surface 53A of the step surface 52A to vary a direction of the flow, and returns to the upstream side to generate a primary vortex Y1 turning counterclockwise (in a first direction) in the drawings of FIGS. 2 and 4 in the first cavity C1.

In addition, when the steam S collides with the step surface 53A, as a part of the flow is separated from the primary vortex Y1 at the end edge 55 of the step surface 52A, a separation vortex Y2 is generated in the small cavity 18. The separation vortex Y2 turns in a direction (a second direction) opposite to the turning direction of the primary vortex Y1, i.e., clockwise in the drawings of FIGS. 2 and 4.

Specifically, as shown in FIG. 4, when the flow of the part from the primary vortex Y1 is separated at the end edge 55 and the steam S flows into the small cavity 18, the flowing steam S arrives at the inner circumference wall surface 17a and then flows to the axial direction downstream side along the inner circumference wall surface 17a. Next, after a flow direction of the steam S is changed toward the step surface 52A side by the fin main body part 16, the steam S flows inside in the radial direction along the fin main body part 16. Next, after the flow direction of the steam S is changed toward the axial direction upstream side by the step surface 52A, the steam S flows toward the axial direction upstream side along the step surface 52A inside in the radial direction of the small cavity 18. Next, after the flow direction of the steam S is changed toward the outside in the radial direction, the steam S flows again toward the inner circumference wall surface 17a in the outside in the radial direction by the primary vortex Y1 and separate steam S which flows into the small cavity 18 separated from the primary vortex Y1.

The separation vortex Y2 turning in the direction opposite to the turning direction of the primary vortex Y1 is generated in the small cavity 18 by the series of flows of the steam S.

Since a space outside in the radial direction is restricted by the inner circumference wall surface 17a (see FIG. 3), dispersion of the steam S toward the outside in the radial direction is restricted. In addition, since generation of the flow of the steam S toward the axial direction downstream side is restricted by the inner circumference wall surface 17a, the flow of the separation vortex Y2 can be further strengthened.

As the separation vortex Y2 is generated, the leakage flow of the steam S passing through the small space H1 between the fin main body part 16 of the seal fin 15A and the step surface 52A is reduced, and a contraction flow effect is generated.

That is, as shown in FIG. 4, as the separation vortex Y2 is generated, a downflow that causes a velocity vector of the leakage flow to be directed to the inside in the radial direction is generated at the axial direction upstream side of the small space H1. Since the downflow has a force of inertia toward the inside in the radial direction just before the small space H1 (at a position slightly moved from the axial direction upstream side), an effect (contraction flow effect) of contracting the leakage flow passing through the small space H1 at the axial direction downstream side toward the inside in the radial direction is generated. As a result, the amount of leakage of the steam S via the small space H1 is reduced.

Since the small cavity 18 has the square shape, as shown in FIGS. 2 and 3, in the cross section at the surface including the rotation axis, the separation vortex Y2 is considered to have a substantially circular shape.

In addition, since any one of the width of the inner circumference wall surface 17a in the axial direction and the interval between the inner circumference wall surface 17a and the step surface 52A is about two times that of the small space H1, a diameter of the separation vortex Y2 is about two times the width of the small space H1. When the diameter of the separation vortex Y2 is about two times the width of the small space H1 and its outer circumference is in contact with the tip of the fin main body part 16, a position at which the velocity element in the radial direction is maximized in the downflow of the separation vortex Y2 substantially coincides with the tip (inner end edge) of the fin main body part 16. Accordingly, since the downflow passes through just before the small space H1 toward the inside in the radial direction at a maximum velocity, the contraction flow effect with respect to the leakage flow is considered to be further increased.

In addition, as the separation vortex Y2 is generated in the small cavity 18 corresponding to the seal fin 15A, even when the amount of leakage of the steam S passing through the small space H1 is reduced, a slight leakage flow flowing toward the axial direction downstream side is generated. For this reason, a separate primary vortex Y1 is generated in the second cavity C2 of the downstream side. As the primary vortex Y1 in the second cavity C2 is separated at the end edge 55 of the step surface 52B, the separation vortex Y2 is generated in the small cavity 18 corresponding to the seal fin 15B. Similarly, a further separate primary vortex Y1 is generated in the third cavity C3 of the downstream side, and the separation vortex Y2 is generated in the small cavity 18 corresponding to the seal fin 15C.

That is, as shown in FIG. 2, the separation vortices Y2 are generated in the small cavities 18 at the axial direction upstream sides of the small spaces H1 to H3. As the separation vortices Y2 are generated, the contraction flow effect with respect to the leakage flow of the steam S passing through the small spaces H1 to H3 is generated, and the amount of leakage is sequentially reduced.

According to the steam turbine 1 of the embodiment, as the steam S flowing into the cavities C (C1 to C3) collides with the step surfaces 53 (53A to 53C) that form the end edges 55 of the step surfaces 52 (52A to 52C) to vary the flow direction and returns to the upstream side, the primary vortex Y1 turning in the first direction is generated. In addition, as the flow of the part from the primary vortex Y1 is separated at the end edges 55 of the step surfaces 53 (53A to 53C), the separation vortex Y2 turning in the second direction opposite to the first direction is generated. As the separation vortex Y2 is generated, the leakage flow passing through the small spaces H (H1 to H3) between the fin main body parts 16 and the step surfaces 52 (52A to 52C) is reduced, and the contraction flow effect is generated. Further, since the small cavities 18 are formed between the cavities C (C1 to C3) and the small spaces H (H1 to H3) by the space restriction parts 17, the flow of the separation vortex Y2 in the small cavities 18 narrower than the cavities C (C1 to C3) is strengthened. Accordingly, the contraction flow effect can be sufficiently enhanced by the separation vortex Y2, and the leakage flow rate passing through the small spaces H (H1 to H3) can be reduced.

In addition, since the inner circumference wall surface 17a extending from the fin main body part 16 toward the axial direction upstream side is provided, the flow of the separation vortex Y2 is restricted by the inner circumference wall surface 17a and the fin main body part 16. Accordingly, the flow of the separation vortex Y2 can be strengthened, the contraction flow effect can be further increased, and the separation vortex Y2 can be stably maintained.

Further, since the contraction flow effect by the separation vortex Y2 can be obtained at each of the step surfaces 52 (52A to 52C), the leakage flow rate between the moving blade 50 and the partition plate outer wheel 11 corresponding thereto can be sufficiently reduced.

Furthermore, as the separation vortex Y2 is generated in the small cavity 18 corresponding to the step surface 52A disposed at the furthest upstream side in the axial direction, the leakage flow rate between the moving blade 50 and the partition plate outer wheel 11 corresponding thereto can be sufficiently reduced.

Next, a variant of the first embodiment will be described with reference to FIGS. 5 to 12.

In addition, in FIGS. 5 to 12, like elements from FIGS. 1 to 4 are designated by like reference numerals, and a description thereof will not be repeated here.

Figure 5:
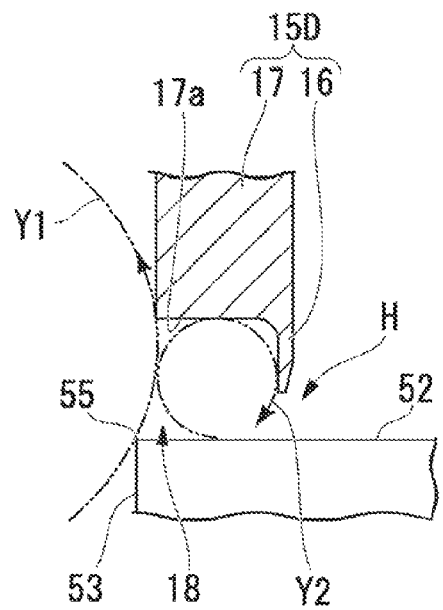
FIG. 5 is a cross-sectional view of a seal fin according to a variant of the first embodiment.

As shown in FIG. 5, a seal fin 15D has an inner circumference wall surface 17a smoothly connected to the fin main body part 16 in an arc shape when seen from a cross-sectional view. In other words, a connecting part between the inner circumference wall surface 17a and the fin main body part 16 is recessed in an arc shape when seen from a cross-sectional view. The connecting part between the inner circumference wall surface 17a and the fin main body part 16 is formed by, for example, machining a fillet R.

In the variant, since the inner circumference wall surface 17a is connected to the fin main body part 16 in an arc shape when seen from a cross-sectional view, the separation vortex Y2 flows in an arc shape along the fin main body part 16 from the inner circumference wall surface 17a when seen from a cross-sectional view. Accordingly, the separation vortex Y2 flowing along the inner circumference wall surface 17a can smoothly flow along the fin main body part 16, and a restriction effect to the separation vortex Y2 can be enhanced. Therefore, the flow of the separation vortex Y2 can be strengthened, the contraction flow effect can be further increased, and the separation vortex Y2 can be stably maintained.

Figure 6:
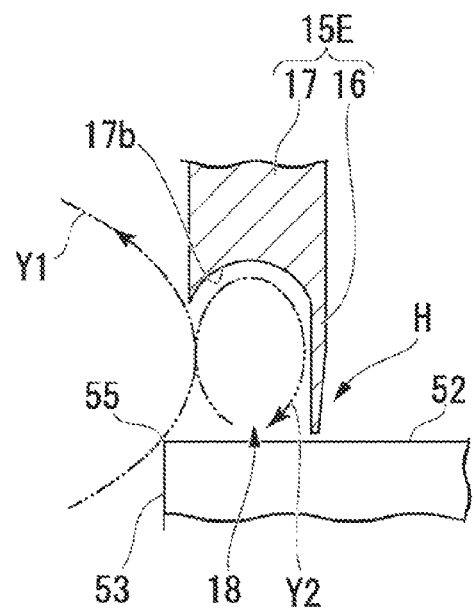
FIG. 6 is a cross-sectional view of a seal fin according to a variant of the first embodiment.

As shown in FIG. 6, a seal fin 15E has an inner circumference wall surface 17b recessed in an arc shape when seen from a cross-sectional view.

In the variant, since the inner circumference wall surface 17b is recessed in an arc shape when seen from a cross-sectional view, the separation vortex Y2 flows along the inner circumference wall surface 17b in an arc shape when seen from a cross-sectional view. Accordingly, the flow direction of the separation vortex Y2 can be smoothly changed, and the restriction effect of the separation vortex Y2 can be further enhanced. Therefore, the flow of the separation vortex Y2 can be strengthened, the contraction flow effect can be further increased, and the separation vortex Y2 can be stably maintained.

Figure 7:
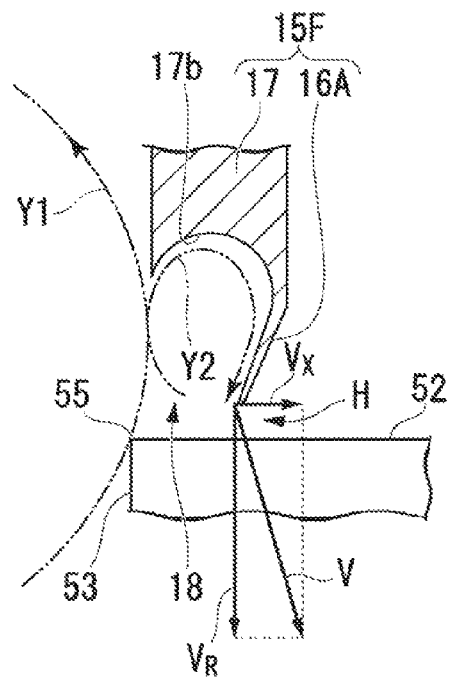
FIG. 7 is a cross-sectional view of a seal fin according to a variant of the first embodiment.

As shown in FIG. 7, a seal fin 15F has a fin main body part 16A extending at a tilted angle toward the axial direction upstream side.

In the variant, since the fin main body part 16A extends at a tilted angle toward the axial direction upstream side, a downflow of the separation vortex Y2 flows toward the leakage flow flowing toward the downstream side in a direction of the rotation axis at the axial direction upstream side of the small space H. For this reason, an axial direction velocity element $V_X$ of a flow velocity V in which the leakage flow and the downflow of the separation vortex Y2 are joined is reduced in the vicinity of a tip part of the fin main body part 16A. Provided that a radial direction velocity element of the flow velocity V is $V_R$, in the vicinity of the tip part of the fin main body part 16A, since the contraction flow effect of the separation vortex Y2 is increased as $V_X/V_R$ approaches 0, the contraction flow effect can be further enhanced.

In addition, when at least a part of a tip side of the fin main body part 16A extends at a tilted angle toward the axial direction upstream side, the contraction flow effect can be enhanced.

Figure 8:
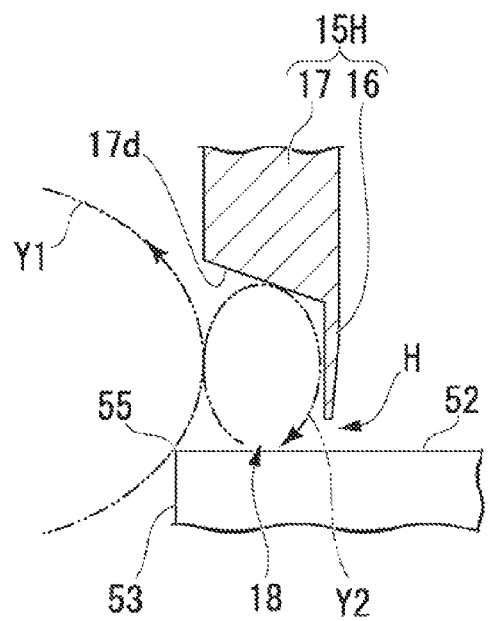
FIG. 8 is a cross-sectional view of a seal fin according to a variant of the first embodiment.

As shown in FIG. 8, a seal fin 15H has an inner circumference wall surface 17d gradually tilted toward the inside in the radial direction from the upstream side to the downstream side in the axial direction.

In the variant, as the steam S separating from the primary vortex Y1 and flowing into the small cavity 18 at the end edge 55 is smoothly introduced to the axial direction downstream side along the inner circumference wall surface 17d, a strong separation vortex Y2 can be generated. That is, since the separation vortex Y2 flowing along the inner circumference wall surface 17d can smoothly flow along the fin main body part 16, strength of the flow of the separation vortex Y2 from the inner circumference wall surface 17d toward the fin main body part 16 is not reduced. Accordingly, the strong separation vortex Y2 can be generated, and the contraction flow effect can be further enhanced.

In addition, the inner circumference wall surface 17d may be formed in an arc shape when seen from a cross-sectional view as the inner circumference wall surface 17b of FIG. 6.

Figure 9:
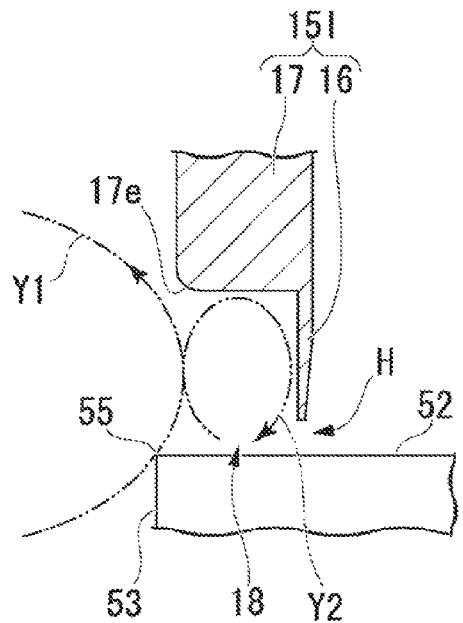
FIG. 9 is a cross-sectional view of a seal fin according to a variant of the first embodiment.

As shown in FIG. 9, a seal fin 15I has a corner 17e, which is an end edge of the axial direction upstream side of the space restriction part 17, formed in an arc shape when seen from a cross-sectional view.

In the variant, after the steam S separated from the primary vortex Y1 at the end edge 55 flows into the small cavity 18, a part of the primary vortex Y1 can be prevented from being separated from the primary vortex Y1 at the corner 17e. For this reason, the flow separated from the primary vortex Y1 is resultantly strengthened at the end edge 55 while the flow of the primary vortex Y1 is not weakened. Accordingly, the flow of the separation vortex Y2 can be strengthened.

Figure 10:
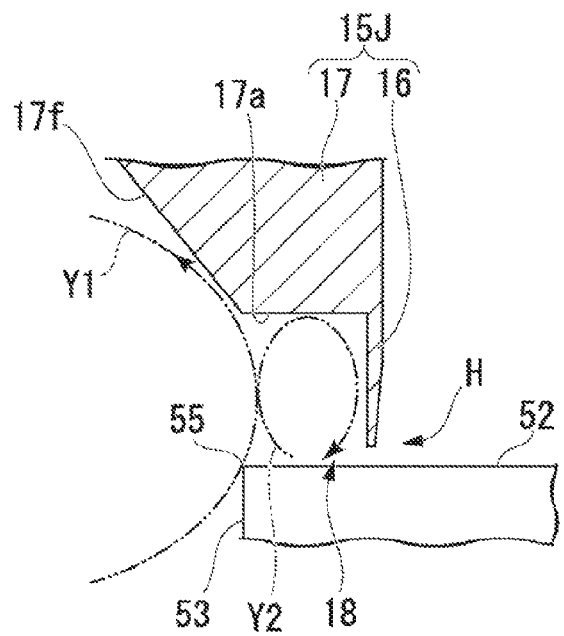
FIG. 10 is a cross-sectional view of a seal fin according to a variant of the first embodiment.

As shown in FIG. 10, a seal fin 15J has an edge surface 17f formed at the axial direction upstream side of the space restriction part 17 and gradually tilted toward the inside in the radial direction from the upstream side to the downstream side in the axial direction. The edge surface 17f is formed to be in contact with the axial direction upstream side of the inner circumference wall surface 17a.

In the variant, since the primary vortex Y1 flows along at least a part of the edge surface 17f, the flow of the primary vortex Y1 can be prevented from being weakened. Since the flow separated from the primary vortex Y1 is resultantly strengthened at the end edge 55, the flow of the separation vortex Y2 can be strengthened.

Figure 11:
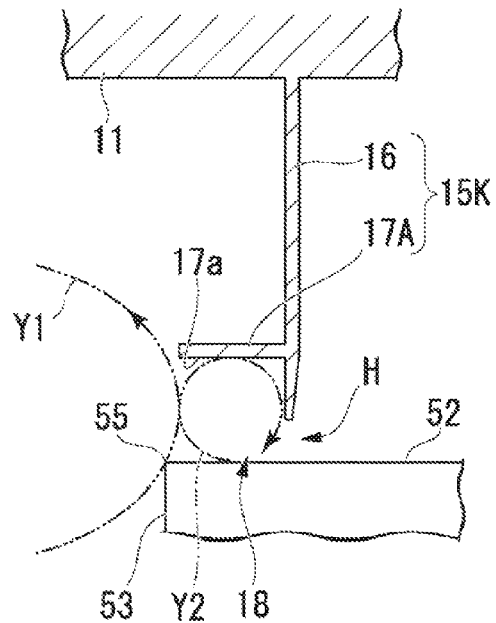
FIG. 11 is a cross-sectional view of a seal fin according to a variant of the first embodiment.

As shown in FIG. 11, a seal fin 15K has a space restriction part 17A extending from a side surface of the fin main body part 16 toward the axial direction upstream side. The fin main body part 16 is directly connected to the partition plate outer wheel 11, and extends from the partition plate outer wheel 11 toward the step surface 52. The space restriction part 17A has a wall body extending in the axial direction. An interval between the space restriction part 17A and the step surfaces 52 is about two times the small space H. Since, only the fin main body part 16 supports the space restriction part 17A, stiffness of the seal fin 15K is low.

In the variant, even when the moving blade 50 is in contact with the seal fin 15K incidentally displaced outward in the radial direction, since the stiffness of the seal fin 15K is low, the seal fin 15K can be easily buckled. For this reason, damage to the moving blade 50 and the partition plate outer wheel 11 can be suppressed.

Figure 12:
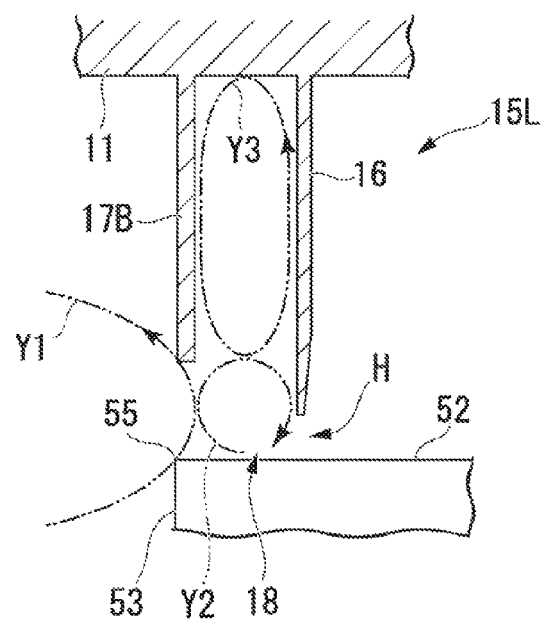
FIG. 12 is a cross-sectional view of a seal fin according to a variant of the first embodiment.

As shown in FIG. 12, a seal fin 15L includes a fin main body part 16, and a fin-shaped space restriction part (a radial direction wall body) 17B spaced apart from the fin main body part 16 at the axial direction upstream side by an interval, extending toward the step surface 52, and having a space formed between the part 17B and the step surface 52 and larger than the small space H.

In the variant, the separation vortex Y2 and an auxiliary vortex Y3 turning in a first direction, which is the turning direction of the primary vortex Y1 near the separation vortex Y2 in the radial direction, are formed in the small cavity 18. As the auxiliary vortex Y3 is formed, a shape of the separation vortex Y2 is a substantially circular shape. In addition, since there is no inner circumference wall surface (a wall surface facing to the step surface 52) to restrict the flow of the separation vortex Y2 at the seal fin 15L, a contact flow resistance of the separation vortex Y2 is reduced. Accordingly, the flow of the separation vortex Y2 can be strengthened to further increase the contraction flow effect.

(Second Embodiment)

Hereinafter, a steam turbine 2 according to a second embodiment of the present invention will be described with reference to FIG. 13.

Figure 13:
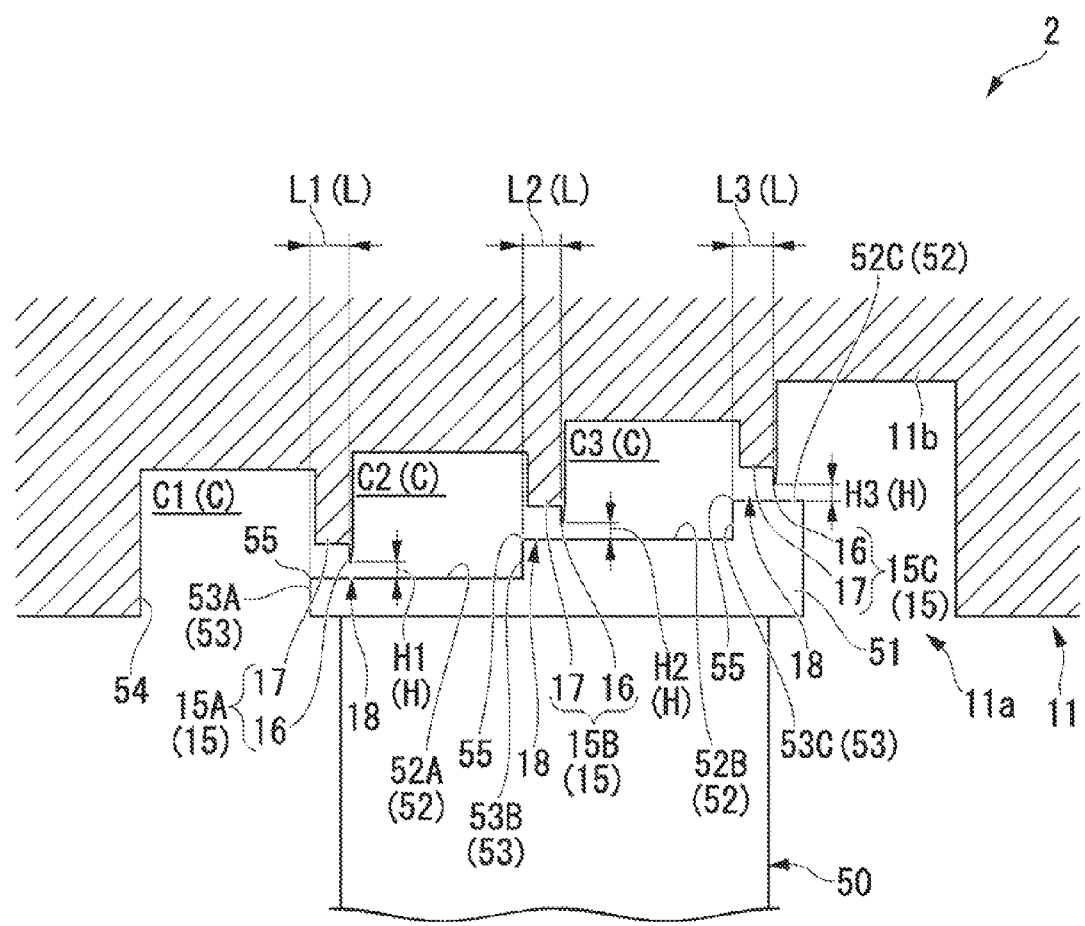
FIG. 13 is a cross-sectional view showing a steam turbine according to a second embodiment of the present invention.

FIG. 13 is a cross-sectional view showing the steam turbine 2 corresponding to FIG. 2 of the first embodiment. In addition, like element from FIGS. 1 to 12 are designated by like reference numerals, and a description thereof will not be repeated here.

In the embodiment, a simulation is performed under the knowledge that there are conditions under which the contraction flow effect can be obtained, and elements of the steam turbine 2 are provided according to the conditions under the contraction flow effect could be obtained.

As shown in FIG. 13, provided that an axial direction distance between the fin main body part 16 and the end edge 55 of the axial direction upstream side of each of the step surfaces 52 corresponding to each of the fin main body parts 16 (i.e., an axial direction between the fin main body part 16 and the step surface 53) is L (L1 to L3), the distance L satisfies the following Equation (1).

$$0.7H \leq L \tag{1}$$

Here, the distance L is a width in the axial direction in the small cavity 18.

In addition, during stoppage and operation of the steam turbine 2, there is a probability of variation in dimension of the small space H or the distance L. For this reason, in order to effectively obtain the contraction flow effect, Equation (1) should be satisfied during the operation of the steam turbine 2.

Further, in the embodiment, since all of H1 to H3 have the same dimension, H represents H1 to H3.

(Simulation)

Simulation results in relations between the distance L, change amount in turbine efficiency and a rate of change in leakage amount shown in FIG. 13 will be described below.

Figure 14:
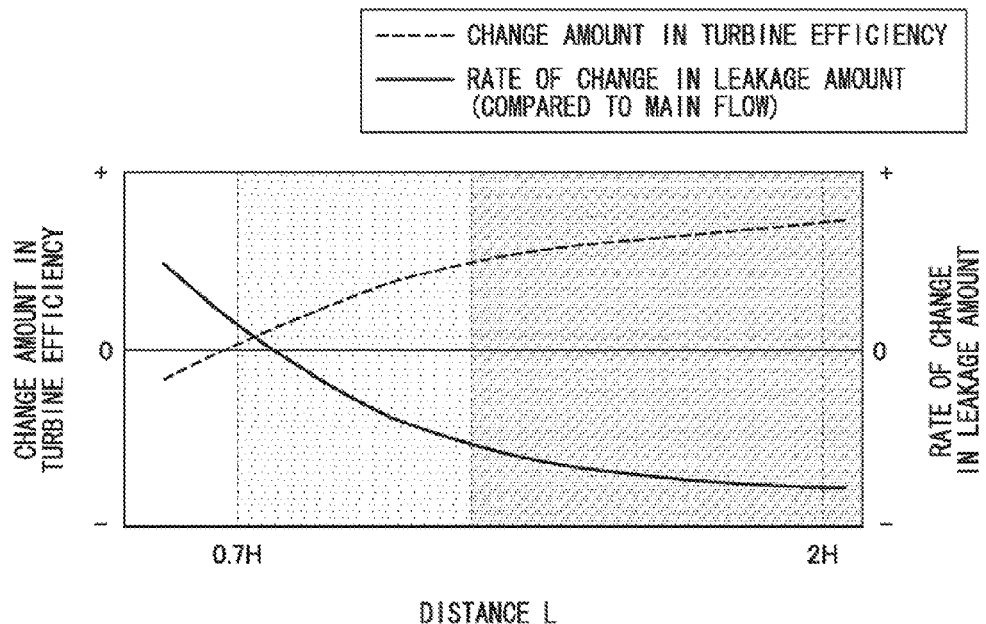
FIG. 14 is a graph showing a simulation result of the steam turbine according to the second embodiment.

FIG. 14 is a graph showing the simulation results. A horizontal axis of FIG. 14 represents a dimension (length) of a distance L, and a vertical axis represents change amount in turbine efficiency and a rate of change in leakage amount. In addition, in the change amount in turbine efficiency and the rate of change in leakage amount, the degrees with respect to turbine efficiency and a leakage flow rate in a conventional step fin structure are shown. Further, any one of the horizontal axis and the vertical axis of FIG. 14 is a general arithmetic scale.

As shown in FIG. 14, the distance L may be set to satisfy the following Equation (1).

$$0.7H \leq L \tag{1}$$

That is, as shown in FIG. 14, when the distance L is less than 0.7H (L<0.7H), since a width (width in the axial direction) of the small cavity 18 is insufficient, the separation vortex Y2 cannot be easily generated at the end edge 55. For this reason, the downflow of the separation vortex Y2 at the axial direction upstream side of the fin main body part 16 cannot be sufficiently formed. Accordingly, the contraction flow effect with respect to the leakage flow by the downflow is extremely reduced. Since the leakage flow rate is increased, the rate of change in leakage amount is increased (+side) as shown in FIG. 14. In addition, since the turbine efficiency is reduced as the leakage flow rate is increased, the change amount in turbine efficiency is reduced (−side) as shown in FIG. 14.

Meanwhile, when Equation (1) is satisfied, since a width (width in the axial direction) of the small cavity 18 is sufficiently secured, the separation vortex Y2 can be easily generated at the end edge 55. For this reason, the downflow of the separation vortex Y2 at the axial direction upstream side of the fin main body part 16 is sufficiently formed. Accordingly, the contraction flow effect with respect to the leakage flow by the downflow can be sufficiently obtained. Since the leakage flow rate is increased, as shown in FIG. 14, the rate of change in leakage amount is reduced (−side). In addition, since the turbine efficiency is improved as the leakage flow rate is reduced, change amount in turbine efficiency is increased (+side).

Figure 15:
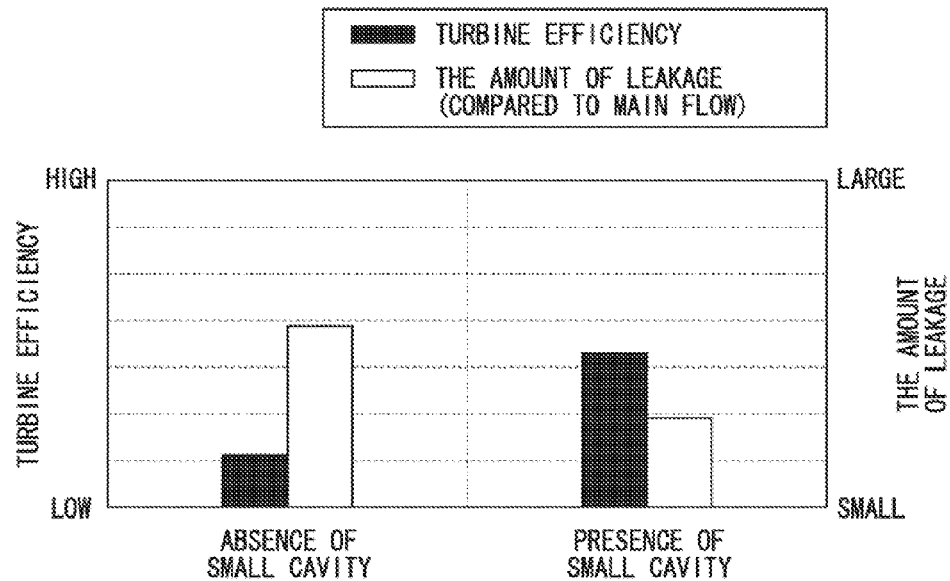
FIG. 15 is a graph showing a simulation result of the steam turbine according to the second embodiment.

FIG. 15 is a graph showing the simulation results. FIG. 15 shows comparison results of the change amount in turbine efficiency and the rate of change in leakage amount in the turbine with the small cavity 18 in which a distance of 0.7 H or more is set, and the turbine with no small cavity.

As shown in FIG. 15, the turbine with the small cavity 18 has a small amount of leakage and high turbine efficiency in comparison with the turbine with no small cavity 18.

The distance L (L1 to L3) is set to satisfy Equation (1) based on the simulation results.

Accordingly, in each of the small cavities 18, since a positional relation between each of the step surfaces 52A to 52C and the fin main body part 16 corresponding thereto satisfies Equation (1), the contraction flow effect by the separation vortex Y2 is sufficiently enhanced, and the leakage flow rate is remarkably reduced in comparison with the conventional art. Therefore, in the steam turbine 2 with the seal structure, the leakage flow rate is further reduced, and its performance can be further improved.

(Third Embodiment)

Next, a steam turbine 3 according to a third embodiment of the present invention will be described with reference to FIG. 16.

Figure 16:
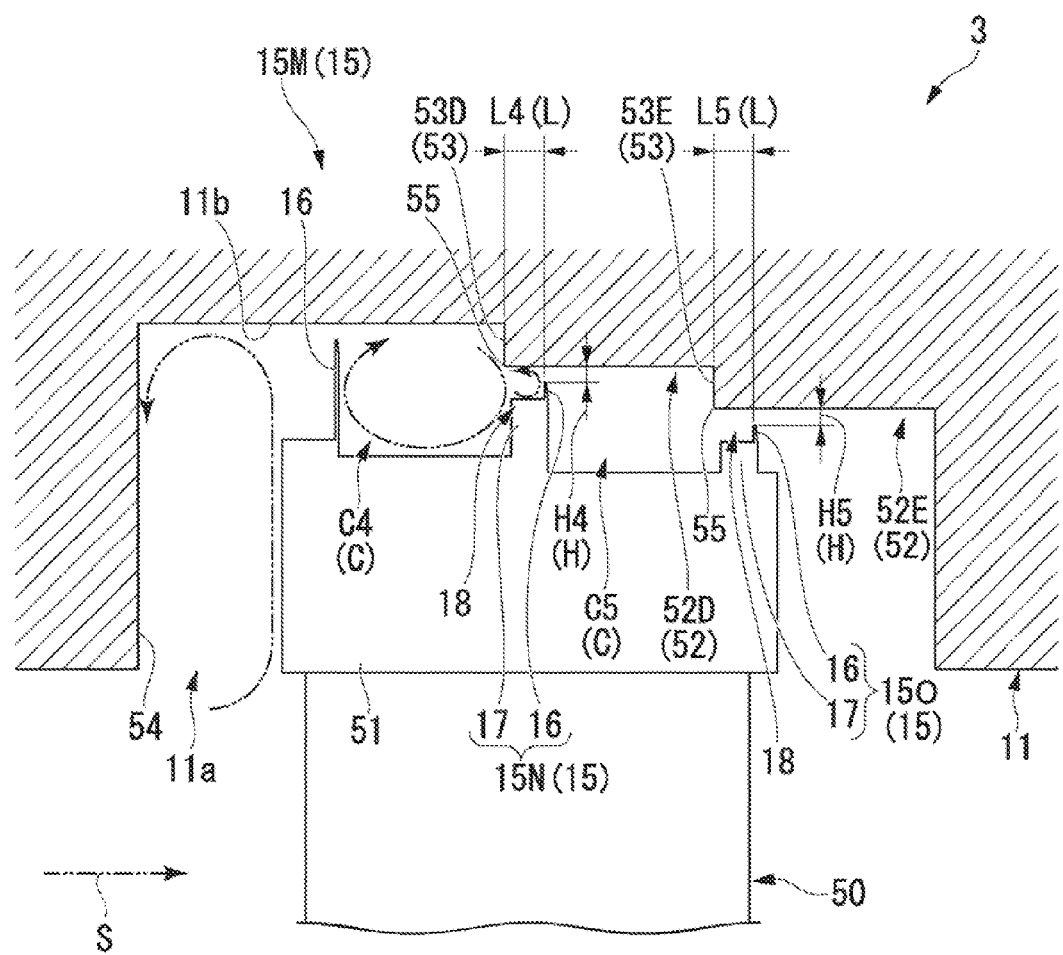
FIG. 16 is a cross-sectional view showing a steam turbine according to a third embodiment of the present invention.

FIG. 16 is a cross-sectional view showing the steam turbine 3 corresponding to FIG. 2 of the first embodiment. In addition, like elements from FIGS. 1 to 15 are designated by like reference numerals, and a description thereof will not be repeated here.

The third embodiment shown in FIG. 16 is distinguished from the first embodiment by the following features. In the first embodiment, the step surfaces 52 (52A to 52C) are formed at the tip shroud 51 installed at the tip part of the moving blade 50, and the seal fins 15 (15A to 15C) are installed at the partition plate outer wheel 11 fixed to the casing 10. Meanwhile, in the third embodiment, step surfaces 52 are formed at the partition plate outer wheel 11, and seal fins 15 are installed at the tip shroud 51.

In the third embodiment, as shown in FIG. 16, the two step surfaces 52 are formed at the groove bottom surface 11b of the annular groove 11a formed in the partition plate outer wheel (structure) 11. The two step surfaces 52 are a step surface 52D having a step surface 53D, and a step surface 52E having a step surface 53E and formed at an axial direction downstream side of the step surface 52D. The step surfaces 52D and 52E are disposed such that a protrusion height toward the moving blade 50 side is gradually increased as it moves toward the axial direction downstream side. Meanwhile, the three seal fins 15 (15M to 15O) extending toward the groove bottom surface 11b outside in the radial direction are installed at the tip shroud 51 installed at the tip part of the moving blade 50.

Among the seal fins 15 (15M to 15O), the seal fin 15M of the farthest upstream side in the axial direction includes only a fin main body part 16 provided with a space restriction part 17. The seal fin 15M extends toward the groove bottom surface 11b disposed at the axial direction upstream side of the step surface 52D, and a small space is formed between the seal fin 15M and the groove bottom surface 11b in the radial direction.

In addition, any one of the seal fins 15N and 15O includes the fin main body part 16 and the space restriction part 17. The seal fins 15N and 15O extend to correspond to the step surfaces 52D and 52E. The fin main body parts 16 of the seal fins 15N and 15O form small spaces H (H4 and H5) in the radial direction between the fin main body parts 16 and the step surfaces 52D and 52E. In addition, in the seal fins 15N and 15O, the space restriction parts 17 restrict a space of the axial direction upstream side of the fin main body parts 16 in the radial direction, and form the small cavity 18 between the step surfaces 52D and 52E.

Similar to the first embodiment, sizes of the small spaces H (H4 and H5) are minimally set within a safety range to prevent contact between the fin main body parts 16 and the step surfaces 52 (52D and 52E) in consideration of a thermal expansion amount of the casing 10 or the moving blade 50, centrifugal elongation of the moving blade 50, and so on. In addition, H4 and H5 are set to have the same size. However, according to necessity, these sizes may be appropriately changed.

As shown in FIG. 16, the cavities C (C4 and C5) are formed between the tip shroud 51 and a part (the annular groove 11a) of the partition plate outer wheel 11 corresponding to the tip shroud 51.

Similar to the first embodiment, the cavities C (C4 and C5) are formed between the seal fins 15 (15N and 15O) corresponding to the step surfaces 52 (52D and 52E) and partition walls facing to the axial direction upstream side with respect to the seal fins 15.

In the first cavity C4 disposed at the farthest upstream side in the axial direction, the partition wall is formed by the seal fin 15M. That is, the first cavity C4 is formed between the seal fin 15M, the seal fin 15N, the tip shroud 51, and the partition plate outer wheel 11 (the groove bottom surface 11b).

In addition, in the second cavity C5, the partition wall is formed by the seal fin 15N. That is, the second cavity C5 is formed between the seal fin 15N, the seal fin 15O, the tip shroud 51, and the partition plate outer wheel 11 (the groove bottom surface 11b).

When the axial direction distance between the fin main body part 16 and the end edge 55 of the axial direction upstream side of each of the step surfaces 52 corresponding to each of the fin main body parts 16 (i.e., an axial direction distance between the fin main body part 16 and the step surfaces 53) is L (L4 and L5), Equation (1) is satisfied.

The small cavities 18 are formed between the cavities C (C4 and C5) and the small spaces H (H4 and H5).

Since a positional relation between the step surfaces 52D and 52E and the fin main body parts 16 of the seal fins 15N and 15O corresponding thereto satisfies Equation (1), the contraction flow effect with respect to the leakage flow by the separation vortex Y2 is sufficiently increased, and the leakage flow rate is remarkably reduced in comparison with the conventional art. Accordingly, in the steam turbine 3 provided with the seal structure, the leakage flow rate can be further reduced, and its performance can be further improved.

In addition, in the steam turbine 3 of the embodiment, since the two small cavities 18 formed as the stepped part are formed into two stages, the leakage flow rate can be reduced by the contraction flow effect at each of the small cavities 18. For this reason, the leakage flow rate can be reduced as a whole.

(Fourth Embodiment)

Next, a steam turbine 4 according to a fourth embodiment of the present invention will be described with reference to FIG. 17.

Figure 17:
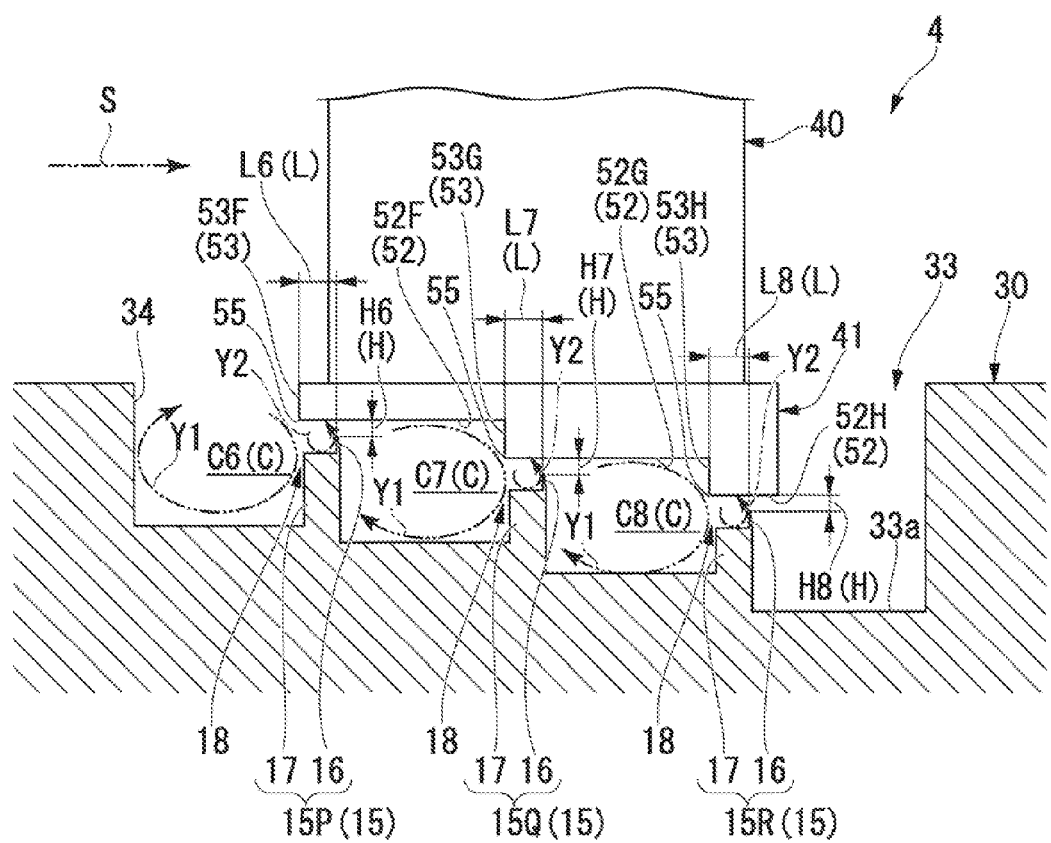
FIG. 17 is a cross-sectional view showing a steam turbine according to a fourth embodiment of the present invention.

FIG. 17 is an enlarged cross-sectional view showing a part corresponding to a major part J in FIG. 1 of the first embodiment corresponding to FIG. 2 of the first embodiment.

In addition, like elements from FIGS. 1 to 16 are designated by like reference numerals, and a description thereof will not be repeated here.

The fourth embodiment shown in FIG. 17 is distinguished from the first embodiment by the following features. In the first embodiment, the "blade" according to the present invention is provided as the moving blade 50, the step surfaces 52 (52A to 52C) are formed at the tip shroud 51 installed at the tip part of the moving blade 50, the "structure" according to the present invention is provided as the partition plate outer wheel 11, and the seal fins 15 (15A to 15C) are installed at the partition plate outer wheel 11. Meanwhile, in the fourth embodiment, the "blade" according to the present invention is provided as the stationary blade 40, the step surfaces 52 are formed at the tip part of the stationary blade 40, the "structure" according to the present invention is provided as the shaft body 30, and the seal fins 15 are installed at the shaft body 30.

In the fourth embodiment, as shown in FIG. 17, three step surfaces 52 (52F to 52H) are formed at the hub shroud 41 extending in the circumferential direction from the tip part of the stationary blade 40.

The three step surfaces 52F to 52H are disposed from the upstream side to the downstream side in the axial direction of the shaft body 30 such that a protrusion height is gradually increased from the stationary blade 40 toward the shaft body 30. Step surfaces 53 (53F to 53H) forming step differences of the step surfaces 52 (52F to 52H) are formed toward the axial direction upstream side.

An annular groove 33 extending in the circumferential direction is formed at the part of the shaft body 30 corresponding to the hub shroud 41. The annular groove 33 is formed between disks 32 and 32 of the shaft body 30. The hub shroud 41 is accommodated in the annular groove 33. In addition, three seal fins 15 (15P to 15R) extending toward the hub shroud 41 outside in the radial direction are installed at a groove bottom surface 33a in the annular groove 33. The annular groove 33 is formed such that the downstream side becomes deeper than the axial direction upstream side of each of the seal fins 15. That is, the groove bottom surface 33a of the annular groove 33 is formed in a stepped shape from the upstream side to the downstream side in the axial direction to be gradually spaced apart from the stationary blade 40.

Any one of the seal fins 15 (15P to 15R) includes the fin main body part 16 and the space restriction part 17. The seal fins 15 (15P to 15R) extend from the groove bottom surface 33a in one-to-one correspondence with the step surfaces 52 (52F to 52H). Specifically, the seal fins 15 (15P to 15R) are installed to face parts (near the end edges 55) of the axial direction upstream side of the step surfaces 52 (52F to 52H). In addition, the step surfaces 53 (53F to 53H) of the step surfaces 52 (52F to 52H) are formed at a slightly upstream side from the seal fins 15 (15P to 15R) in the axial direction.

In the seal fins 15 (15P to 15R), the fin main body part 16 forms the small spaces H (H6 to H8) in the radial direction between the step surfaces 52 (52F to 52H). In addition, the space restriction parts 17 restrict spaces of the axial direction upstream side of the fin main body parts 16 in the radial direction to form the small cavities 18 between the space restriction parts 17 and the step surfaces 52 (52F to 52H).

As shown in FIG. 17, cavities C (C6 to C8) are formed between the hub shroud 41 and a part (the annular groove 33) of the shaft body 30 corresponding to the hub shroud 41.

The cavities C (C6 to C8) are formed between the seal fins 15 corresponding to the step surfaces 52 and a partition wall (an inner wall surface 34 of the axial direction upstream side of the annular groove 33 or another seal fin 15 near the axial direction upstream side) facing to the axial direction upstream side with respect to the seal fins 15. The small cavities 18 are formed between the cavities C (C6 to C8) and the small spaces H (H6 to H8).

When axial direction distances between the fin main body parts 16 and the end edges 55 of the axial direction upstream side of the step surfaces 52 are L (L6 to L8), at least one of these distances L satisfies Equation (1).

Since a positional relation between at least one of the step surfaces 52F to 52H and the fin main body part 16 corresponding thereto satisfies Equation (1), the contraction flow effect with respect to the leakage flow by the separation vortex Y2 is sufficiently increased, and the leakage flow rate is remarkably reduced in comparison with the conventional art. Accordingly, in the steam turbine 4 provided with the seal structure, the leakage flow rate can be further reduced, and its performance can be further improved.

(Fifth Embodiment)

Next, a steam turbine 5 according to a fifth embodiment of the present invention will be described with reference to FIG. 18.

Figure 18:
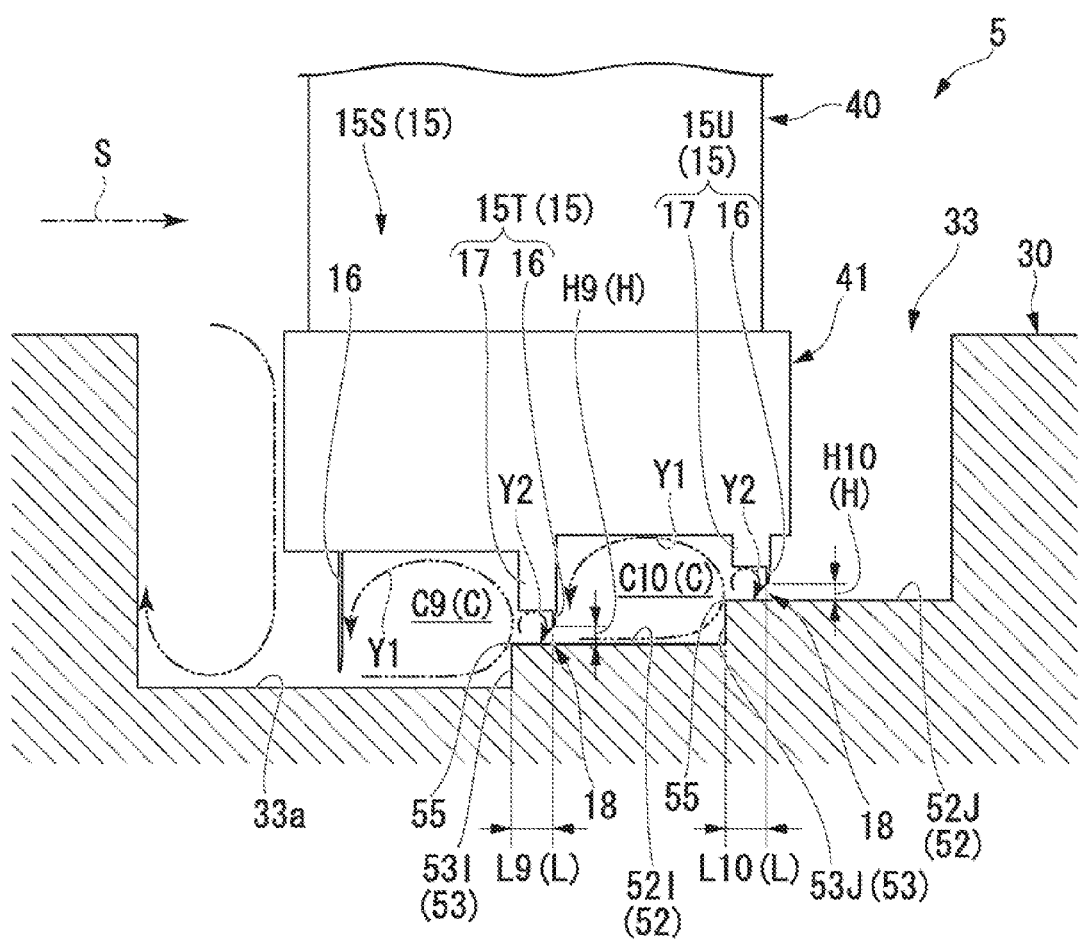
FIG. 18 is a cross-sectional view showing a steam turbine according to a fifth embodiment of the present invention.

FIG. 18 is an enlarged cross-sectional view showing a part corresponding to the major part J in FIG. 1 of the first embodiment corresponding to FIG. 17 of the fourth embodiment.

The fifth embodiment shown in FIG. 18 is distinguished from the fourth embodiment by the following features. In the fourth embodiment, the step surfaces 52 (52F to 52H) are formed at the hub shroud 41 installed at the tip part of the stationary blade 40, and the seal fins 15 (15P to 15R) are installed at the shaft body (structure) 30. Meanwhile, in the fifth embodiment, the step surfaces 52 (52I and 52J) are formed at the shaft body (structure) 30, and the seal fins 15 (15S to 15U) are installed at the hub shroud 41.

In the fifth embodiment, as shown in FIG. 18, the step surface 52I having the step surface 53I and the step surface 52J having the step surface 53J and formed at the axial direction downstream side of the step surface 52I are formed in the groove bottom surface 33a of the annular groove 33 formed in the shaft body (structure) 30. The step surfaces 52I and 52J are disposed such that a protrusion height toward the stationary blade 40 side is gradually increased as it moves toward the axial direction downstream side. Meanwhile, three seal fins 15 (15S to 15U) extending toward the groove bottom surface 33a inside in the radial direction are installed at the hub shroud 41 of the stationary blade 40.

Among the seal fins 15 (15S to 15U), the seal fin 15S of the farthest upstream side in the axial direction includes only the fin main body part 16 without the space restriction part 17. The seal fin 15S extends with respect to the groove bottom surface 33a disposed at the axial direction upstream side of the step surface 52I to form a small space in the radial direction between the seal fin 15S and the groove bottom surface 33a.

In addition, any one of the seal fins 15T and 15U includes the fin main body part 16 and the space restriction part 17. The seal fins 15T and 15U extend with respect to the step surfaces 52I and 52J. The fin main body parts 16 of the seal fins 15T and 15U form small spaces H (H9 and H10) in the radial direction between the fin main body parts 16 and the step surfaces 52I and 52J. In the seal fins 15T and 15U, the space restriction parts 17 restrict spaces of the axial direction upstream side of the fin main body parts 16 in the radial direction, and form the small cavities 18 between the space restriction parts 17 and the step surfaces 52I and 52J.

As shown in FIG. 18, cavities C (C9 and C10) are formed between the hub shroud 41 and a part (the annular groove 33) of the shaft body 30 corresponding to the hub shroud 41.

When axial direction distances between the fin main body parts 16 and the end edges 55 of the axial direction upstream side of the step surfaces 52 corresponding thereto are L (L9 and L10), at least one of these distances L satisfies Equation (1).

The small cavities 18 are formed between the cavities C (C9 and C10) and the small spaces H (H9 and H10).

Since a position relational between at least one of the step surfaces 52I and 52J and the fin main body part 16 of the seal fins 15T and 15U corresponding thereto satisfies Equation (1), the contraction flow effect with respect to the leakage flow by the separation vortex Y2 is sufficiently increased, and the leakage flow rate is remarkably reduced in comparison with the conventional art. Accordingly, in the steam turbine 5 provided with the seal structure, the leakage flow rate can be further reduced, and its performance can be further improved.

In addition, the operation sequence or the shapes or assembly of the components in the, above-mentioned embodiments are exemplarily provided, and they may be variously modified based on design requirements without departing from the spirit of the present invention.

For example, in the first to third embodiments, while the partition plate outer wheel 11 installed at the casing 10 is the "structure" of the present invention, the casing 10 may be the "structure" of the present invention, rather than installing the partition plate outer wheel 11. That is, the "structure" of the present invention may be any member as long as the structure surrounds the moving blade 50 and forms the flow path through which fluid passes.

In addition, in the first to fifth embodiments, while the other side (for example, the groove bottom surface 11b or 33a) corresponding to the one side of the stepped parts 52 and on which the seal fin 15 is installed is formed in a stepped shape, a length from the rotation axis to the other side may be constant.

Further, in the second to fifth embodiments, the seal fins 15D to 15L described as the variant of the first embodiment may be used.

Furthermore, in the embodiments, while the plurality of cavities C or the plurality of small cavities 18 may be formed (in the embodiments, two or three), the number of cavities C or small cavities 18 may be arbitrarily one, four or more. In addition, like the embodiments, the seal fins 15 and the step surfaces 52 may not be in one-to-one correspondence with each other, the number of seal fins and step surfaces may be arbitrarily set. For example, the plurality of seal fins 15 may extend from one step surface 52.

Further, while the present invention was applied to the moving blade 50 or the stationary blade 40 of the last stage in the embodiments, the present invention may be applied to the moving blade 50 or the stationary blade 40 of another stage.

Furthermore, in the embodiments, while the present invention was applied to a condensing steam turbine, the present invention may be applied to another type of steam turbine, for example, a two-stage extraction turbine, a steam extraction turbine, an air mixing turbine, and so on.

Moreover, in the embodiments, while the present invention was applied to the steam turbine, the present invention may be applied to a gas turbine. Further, the present invention may be applied to any rotary structure having a rotating blade.

INDUSTRIAL APPLICABILITY

According to the present invention, it is possible to provide a high performance turbine capable of further reducing a leakage flow rate.

DESCRIPTION OF REFERENCE NUMERALS 1 to 5: steam turbine
10: casing

11: partition plate outer wheel (structure)
15 (15A to 15L, 15N to 15R, 15T, 15U): seal fin
16, 16A: fin main body part
17, 17A, 17B: space restriction part
17a to 17d: inner circumference wall surface
17e: corner
17f: edge surface
18: small cavity
30: shaft body (structure)
40: stationary blade (blade)
41: hub shroud (tip part)
50: moving blade (blade)
51: tip shroud (tip part)
52 (52A to 52J): stepped part
55: end edge
C (C1 to C10): cavity
H (H1 to H10): small space
L (L1 to L10): distance
Y1: primary vortex
Y2: separation vortex

What is claimed is:

1. A turbine comprising:
a blade; and
a structure spaced apart from a tip side of the blade by a space and relatively rotated around a rotation axis of a shaft body with respect to the blade,
wherein a stepped part having a flat surface and a step surface protruding toward the structure is formed at a tip part of the blade, and the flat surface and the step surface are formed alternately from an upstream side toward a downstream side of the structure in a direction of the rotation axis,
a seal fin is provided to the structure at a position facing an upstream part of the flat surface, and extends toward the stepped part, and
a first cavity is formed between the tip part of the blade and the structure, and formed between the seal fin and a partition wall facing toward the seal fin at the upstream side, and
wherein the seal fin comprises:
a space restriction part that extends from the structure and has an inner circumference wall surface facing the flat surface,
a side surface facing toward the upstream side, and
a fin main body part that extends toward the tip part of the blade from a downstream portion of the inner circumference wall surface in the direction of the rotation axis and forms a small space between the flat surface,
wherein a second cavity smaller than the first cavity is formed by the flat surface, the space restriction part, and the fin main body part, in an upstream portion of the fin main body part in the direction of the rotation axis,
wherein the second cavity is formed at the downstream side of the first cavity,
wherein the fin main body part is provided so as to be in one-to-one correspondence with the flat surface, and
wherein a height from the flat surface to the structure is larger than a height from the flat surface to the inner circumference wall surface.

2. The turbine according to claim 1, wherein
the inner circumference wall surface is recessed in an arc shape when seen from a cross-sectional view.

3. The turbine according to claim 1, wherein
the inner circumference wall surface is connected to the fin main body part in an arc shape when seen from a cross-sectional view.

4. The turbine according to claim 1, wherein
at least a tip side of the fin main body part extends at a tilted angle toward the upstream side in the direction of the rotation axis.

5. The turbine according to claim 1, wherein
the side surface is spaced apart from the fin main body part by an interval on the upstream side in the direction of the rotation axis, and is a radial direction wall body extending toward the stepped part and forming a space larger than the small space between the wall body and the stepped part.

6. The turbine according to claim 1, wherein
a size of the small space is H, and a distance between the fin main body part and an end edge of the upstream side in the direction of the rotation axis of the stepped part is L, the following Equation (1) is satisfied:

$$0.7H \leq L \quad (1).$$

7. The turbine according to claim 1, wherein
more than one stepped part is provided in such a way that protrusion heights of the stepped parts are gradually increased from the upstream side toward the downstream side in the direction of the rotation axis,
a plurality of the seal fins are provided, and one of the seal fins extending toward the stepped part is provided for each of the stepped parts at the structure, and
one of the seal fins corresponding to the stepped part is the partition wall facing another of the seal fins corresponding to the stepped part adjacent to the downstream side in the direction of the rotation axis.

8. The turbine according to claim 1, wherein more than one stepped part is provided in such a way that protrusion heights of the stepped parts are gradually increased from the upstream side toward the downstream side in the direction of the rotation axis,
a part of the structure corresponding to the tip part of the blade is an annular recess, and
the partition wall, which faces the seal fin corresponding to the stepped part disposed at the farthest upstream side among the plurality of stepped parts in the direction of the rotation axis, is formed by an inner wall surface of the recess on the upstream side in the direction of the rotation axis.

9. The turbine according to claim 1, wherein
a distance between a position at which the fin main body is formed and an end edge of the inner circumference wall surface of the space restriction part in the direction of the rotation axis is shorter than a distance between the position at which the fin main body is formed and an end edge of the flat surface in the direction of the rotation axis.

10. The turbine according to claim 1, wherein
a size of the fin main body part in the direction of the rotation axis is smaller than that of the inner circumference wall surface in the direction of the rotation axis.

11. A turbine comprising:
a blade; and
a structure spaced apart from a tip side of the blade by a space and relatively rotated around a rotation axis of a shaft body with respect to the blade,
wherein a stepped part having a flat surface and a step surface protruding toward a tip part of the blade is formed at the structure, and the flat surface and a step surface are formed alternately from an upstream side toward a downstream side of the structure in a direction of the rotation axis, a seal fin is provided to the tip part of the blade at a position facing an upstream part of the flat surface, and extends toward the stepped part, and
a first cavity is formed between the tip part of the blade and the structure and formed between the seal fin and a partition wall facing toward the seal fin at the upstream side, and
wherein the seal fin comprises:
a space restriction part that extends from the tip part of the blade and has an inner circumference wall surface facing the flat surface,
a side surface facing toward the upstream side, and
a fin main body part that extends toward the structure from a downstream portion of the inner circumference wall surface in the direction of the rotation axis and forms a small space between the flat surface,
wherein a second cavity smaller than the first cavity is formed by the flat surface, the space restriction part, and the fin main body part, in an upstream portion of the fin main body part in the direction of the rotation axis,
wherein the second cavity is formed at the downstream side of the first cavity,
wherein the fin main body part is provided so as to be in one-to-one correspondence with the flat surface, and
wherein a height from the flat surface to the tip part of the blade is larger than a height from the flat surface to the inner circumference wall surface.

12. The turbine according to claim 11, wherein the inner circumference wall surface is recessed in an arc shape when seen from a cross-sectional view.

13. The turbine according to claim 11, wherein the inner circumference wall surface is connected to the fin main body part in an arc shape when seen from a cross-sectional view.

14. The turbine according to claim 11, wherein at least a tip side of the fin main body part extends at a tilted angle toward the upstream side in the direction of the rotation axis.

15. The turbine according to claim 11, wherein the side surface is spaced apart from the fin main body part by an interval on the upstream side in the direction of the rotation axis, and is a radial direction wall body extending toward the stepped part and forming a space larger than the small space between the wall body and the stepped part.

16. The turbine according to claim 11, wherein a size of the small space is H, and a distance between the fin main body part and an end edge of the upstream side in the direction of the rotation axis of the stepped part is L, the following Equation (1) is satisfied:

$$0.7H \leq L \tag{1}$$

17. The turbine according to claim 11, wherein more than one stepped part is provided in such a way that protrusion heights of the stepped parts are gradually increased from the upstream side toward the downstream side in the direction of the rotation axis,
a plurality of the seal fins are provided, and one of the seal fins extending toward the stepped part is provided for each of the stepped parts at the tip part of the blade, and
one of the seal fins corresponding to the stepped part is the partition wall facing another of the seal fins corresponding to the stepped part adjacent to the downstream side in the direction of the rotation axis.

18. The turbine according to claim 11, wherein more than one stepped part is provided in such a way that protrusion heights of the stepped parts are gradually increased from the upstream side toward the downstream side in the direction of the rotation axis,
a part of the structure corresponding to the tip part of the blade is an annular recess, and
the partition wall, which faces the seal fin corresponding to the stepped part disposed at the farthest upstream side among the plurality of stepped parts in the direction of the rotation axis, is formed by an inner wall surface of the recess on the upstream side in the direction of the rotation axis.

19. The turbine according to claim 11, wherein a distance between a position at which the fin main body is formed and an end edge of the inner circumference wall surface of the space restriction part in the direction of the rotation axis is shorter than a distance between the position at which the fin main body is formed and an end edge of the flat surface in the direction of the rotation axis.

20. The turbine according to claim 11, wherein a size of the fin main body part in the direction of the rotation axis is smaller than that of the inner circumference wall surface in the direction of the rotation axis.

* * * * *